(12) United States Patent
Schauβ

(10) Patent No.: US 7,885,008 B2
(45) Date of Patent: Feb. 8, 2011

(54) OPTICAL SYSTEM FOR DIGITAL CINEMA PROJECTION

(75) Inventor: Udo Schauβ, Waldböckelheim (DE)

(73) Assignee: Jos. Schneider Optische Werke GmbH, Bad Kreuznach (DE)

( * ) Notice: Subject to any disclaimer, the term of this patent is extended or adjusted under 35 U.S.C. 154(b) by 13 days.

(21) Appl. No.: 12/279,333

(22) PCT Filed: Feb. 13, 2007

(86) PCT No.: PCT/EP2007/001231
§ 371 (c)(1),
(2), (4) Date: Aug. 13, 2008

(87) PCT Pub. No.: WO2007/093378
PCT Pub. Date: Aug. 23, 2007

(65) Prior Publication Data
US 2009/0303608 A1    Dec. 10, 2009

(30) Foreign Application Priority Data
Feb. 14, 2006    (DE) .................. 10 2006 006 981

(51) Int. Cl.
G02B 9/00    (2006.01)
G02B 15/02    (2006.01)

(52) U.S. Cl. ....................... 359/649; 359/672

(58) Field of Classification Search ......... 359/649–651, 359/672–675
See application file for complete search history.

(56) References Cited

U.S. PATENT DOCUMENTS

| | | |
|---|---|---|
| 5,479,224 A | 12/1995 | Yasugaki et al. |
| 6,188,523 B1 | 2/2001 | Choi |
| 2001/0033426 A1 | 10/2001 | Nakazawa et al. |
| 2003/0103268 A1 | 6/2003 | Nishikawa et al. |
| 2006/0028739 A1 | 2/2006 | Kreitzer et al. |

FOREIGN PATENT DOCUMENTS

| | | |
|---|---|---|
| DE | 1902855 | 8/1969 |
| DE | 3909203 | 4/1990 |
| JP | 2002258154 | 9/2002 |

*Primary Examiner*—William C Choi
(74) *Attorney, Agent, or Firm*—IPxLaw Group LLP

(57) ABSTRACT

The invention relates to an optical system for the projection of digital image data comprising a fixed focal length lens and a pivotable focal length extender. The principal field of application of the invention is digital cinema projection, usually employing the wide-screen format 1.9:1 or the Cinemascope format 2.37:1 (width:height). For format changeover during projection, two different fixed focal lengths are realized by the insertion or removal of the focal length extender (1755) into the lens. The projection lens according to the invention has more favorable optical properties than the conventional zoom lenses, such as a minimal chromatic transverse aberration, high telecentricity, very small distortions and a small volume and weight.

10 Claims, 27 Drawing Sheets

OPTICAL SYSTEM FOR DIGITAL CINEMA PROJECTION

FIELD OF THE INVENTION

The invention relates to a projection lens and an optical system comprising a projection lens for the projection of digital image data.

Projection lenses of this type are primarily used in digital video technology for the projection of digitally recorded images in cinemas, in advertising or in presentations. The principal field of application of the invention is digital cinema projection, however.

Two formats are usually projected in cinema projection: firstly the digital widescreen format, which has a ratio of image width (W) to image height (H) of W:H=1.896:1 and is realized by a DMD (see below) having 2048×1080 square pixels. The digital widescreen format is often also referred to as the 1.9:1 format. Secondly, the digital Cinemascope format is projected, which has the format 2.37:1. In this case, the aspect ratio is increased in width by the (anamorphic) factor of 1.25 required in digital projection, i.e. 1.896*1.25=2.37.

In the Cinemascope format, the image is compressed in width during recording by the recording lens. The recorded image has a width to height ratio of 1.9:1. The rectification during projection is effected by a projection lens which together with an amorphic system on the screen reconstructs the image extended in width in the format 2.37:1.

In the widescreen format, the image is generally already recorded in the format 1.9:1. The recorded image is not altered during projection.

PRIOR ART

In digital video projection technology, digital electrical image signals are converted into optical information and projected onto a projection wall. Two important examples of digital video projection technology are liquid crystal technology (liquid crystal display, LCD) and so-called DLP technology (Digital Light Processing). DLP technology uses matrices of microelectromechanical mirror systems (Digital Mirror Device, DMD) which block or project incident light onto a projection wall depending on the position of the individual mirror elements of the matrices by means of a projection lens. Full-color image information can also be represented, for example by the three primary colors red, green and blue being directed onto three different DMD matrices. These three DMD matrices are driven electronically and in each case generate an image from the three color channels for the individual primary colors. By means of a beam combiner, these individually generated images are brought together again and reproduced via a projection lens in magnified fashion on a projection wall or a screen. The DMD currently used for cinema projection usually has the format 1.9:1, corresponding to 2048*1080 square pixels.

The side facing the beam combiner is referred to hereinafter as object side. In conventional projection technology this corresponds to the film side of the lens.

Since, in digital projection, optical elements that take up a large amount of space, such as e.g. a beam combiner, are integrated between the image information source (e.g. the DMD) and the projection lens, projection lenses for digital projection have to have a high vertex focal length. In this case, the vertex focal length is defined as the distance between the last lens surface on the object side and the focal plane on the object side.

The use of digital projection devices, primarily in public equipment and also for advertising and in the cinema, is constantly increasing and in order to improve the image quality for these purposes requires an increasingly higher resolving power of the projection lenses used in this case, since the size of the micromirrors is decreasing.

In order to obtain a sufficiently high-contrast image in this projection method, it is necessary, therefore, for the projection lenses used for this purposes to have a high modulation transfer function (MTF).

Moreover, the lateral chromatic aberration must be as small as possible, that is to say that points of different colors have to be projected in as far as possible identical fashion by the projection lens.

Furthermore, projection lenses for digital projection have to have a largely telecentric beam path. This is owing to the fact that the beam combiner can feed to the lens only light below a specific limiting angle.

Telecentricity means that the entrance pupil lies virtually at infinity. In other words, the principal rays issuing from the points of the object (that is to say rays through the midpoint of the entrance pupil) run parallel to the optical axis, or do not exceed a specific tolerance angle.

Usually only the two formats mentioned above, namely the 1.9:1 format (widescreen format) and the Cinemascope format 2.37:1, are employed in (digital) image projection in the cinema. The individual cinemas are equipped differently for switching between the widescreen format and the Cinemascope format (with or without an anamorphic system). Some cinemas retain the image height and widen the image, and others retain the image width and alter the image height. Retaining a constant image height on the cinema screen means that when the film format is changed from widescreen to Cinemascope, the curtain is opened wider. With a constant image width, the screen is in this case reduced by curtains from the top and bottom, whereby the visible image height decreases.

In both cinema equipment variants (constant image height or constant image width on the screen), during the projection of the widescreen format 1.9:1, this format is present on the DMD (FIG. 1A) and is projected onto the screen by a projection lens with a predetermined focal length with an unchanged width to height ratio.

When switching from widescreen to Cinemascope (with an anamorphic system), the curtain is opened wider in a cinema with a constant image height on the cinema screen (FIG. 1B). The focal length of the lens remains unchanged since the height remains unchanged.

In a cinema with a constant image width on the cinema screen, when switching from widescreen to Cinemascope (with an anamorphic system), the visible height of the screen is reduced by a curtain from the top and from the bottom (FIG. 1C). The focal length of the lens is increased in order to realize the reduced image height on the screen.

In the case of letterboxing (FIG. 1D), the image on the DMD is already present in the format 2.37:1. In this case, there is an unused region at the top and bottom edges of the DMD. An anamorphic system is not required when switching the projection from widescreen to Cinemascope. The image is projected onto the screen with an unchanged width to height ratio.

In the case of letterboxing (FIG. 1D), in a cinema with a constant image height on the cinema screen, the curtain is opened wider when switching from widescreen to Cinemascope (without an anamorphic system). The focal length of the lens is reduced in this case in order to obtain the larger image width.

In the case of letterboxing (FIG. 1D), in a cinema with a constant image width on the cinema screen, the visible height of the screen is reduced by a curtain from the top and from the bottom when switching from widescreen to Cinemascope (FIG. 1D). The focal length of the lens remains constant in this case.

With regard to the focal lengths of the projection lens, the four application situations presented in table 11 arise for switching from the widescreen format to Cinemascope:

TABLE 11

| Cinemascope projection | Constant image height (on the screen) | Constant image width (on the screen) |
|---|---|---|
| With anamorphic attachment | Unchanged focal length; image widening | Lengthening of the focal length; reduction of the image height |
| Letterboxing (without anamorphic attachment) | Shortening of the focal length; image widening | Unchanged focal length; reduction of the image height |

For switching the formats the cinema equipment is usually fixed for a specific variant: retaining either a constant image height or image width on the screen. As a result of this, only a focal length changeover of the projection lens between two specific focal lengths is necessary.

The necessary focal length changeover is usually realized by a zoom lens. With zoom lenses, however, it is extremely difficult to meet the requirements made of the vertex focal length, the modulation transfer function, the lateral chromatic aberration and the telecentricity for all focal length settings. Added to this is the fact that in the projection of the widescreen or Cinemascope format, the customary zoom lenses are utilized principally in the region of the limit focal lengths. As is known, zoom lenses exhibit the least favorable imaging properties in these focal length ranges especially.

OBJECT

It is an object of the invention to specify a projection lens which avoids the disadvantages of previous zoom lenses.

Achieving the Object

This object is achieved by means of the inventions comprising the features of the independent claims. Advantageous developments of the inventions are characterized in the subclaims. The wording of all the claims is hereby incorporated by reference in the content of this description. The invention also encompasses all expedient and in particular all mentioned combinations of independent and/or dependent claims.

Proceeding from the fact that usually only the two formats mentioned above, namely the 1.9:1 format (widescreen format) and the Cinemascope format 2.37:1 are employed in digital image projection in the cinema, these two formats also only require projection lenses respectively having two different focal lengths. It is therefore proposed to use lenses having fixed focal lengths. These have better properties than the zoom lenses mentioned above.

Therefore, an optical system is proposed comprising a projection lens for the projection of digital image data with a fixed focal length and comprising a focal length extender that can be inserted into the projection lens for changing over between the two focal lengths required.

The pivoting of the focal length extender into the projection lens brings about a 1.25-fold increase in the focal length of a projection lens. A reduction of the projected image by the factor 1.25 is achieved as a result. The vertex focal length remains unchanged in this case, however. Conversely, the predetermined focal length is shortened by removal of the focal length extender.

The use of the focal length extender enables a cinema projector having a fixed focal length projection lens to project both widescreen and Cinemascope films, to be precise even if they are designed for letterboxing. The different situations possible in this case in a movie theater for realizing the widescreen and Cinemascope projection are presented in table 12.

TABLE 12

| Projection of | Constant image height (on the screen, curtain at the sides of the screen) | Constant image width (on the screen, curtain at the top and bottom edges of the screen) |
|---|---|---|
| Widescreen format | Lens with focal length extender pivoted in; No anamorphic system; Visible screen reduced in width through partial closing of the curtain | Lens without focal length extender; No anamorphic system; Visible screen enlarged in height through complete opening of the curtain |
| Cinemascope with anamorphic attachment | Lens with focal length extender pivoted in; With anamorphic system; Visible screen enlarged in width through complete opening of the curtain | Lens with focal length extender pivoted in; With anamorphic system; Visible screen reduced in height through partial closing of the curtain |
| Letterboxing (Cinemascope without anamorphic attachment) | Lens without focal length extender; Without anamorphic system; Visible screen enlarged in width through complete opening of the curtain | Lens without focal length extender; Without anamorphic system; Visible screen reduced in height through partial closing of the curtain |

The focal length extender is configured in such a way that, according to the turret principle, it can be pivoted into the diaphragm air space at the predetermined location of the lens arrangement of the projection lens, or be removed again. However, it can also be configured as a bolt for pushing in. The tolerance for the accuracy of the position of the inserted focal length extender is max. 20 μm.

The focal length extender (also called "range-extender") advantageously has the following elements in the order specified, as viewed from a projection wall:

a) a first negative lens;
b) a second positive lens; and
c) at least three further lenses.

In one advantageous configuration, the at least three further lenses are embodied as follows in the order specified, as viewed from the projection wall:

a) a third negative lens;
b) a fourth positive lens; and
c) a fifth negative lens.

This focal length extender is suitable in particular for a projection lens having a focal length of between 40 and 50 mm.

In another advantageous configuration, the at least three further lenses are embodied as follows in the order specified, as viewed from the projection wall:
a) a third positive lens;
b) a fourth negative lens; and
c) a fifth negative lens.

This focal length extender is suitable in particular for a projection lens having a focal length of between 50 and 100 mm.

The projection lens for the projection of digital image data advantageously has the following elements in the order specified, as viewed from a projection wall:
a) a first negative lens;
b) a second negative lens;
c) a third negative lens;
d) a fourth positive optical assembly;
e) a fifth positive lens;
f) a sixth negative lens;
g) a seventh lens, which is generally positive;
h) an eighth lens, which is generally negative;
i) a ninth negative lens;
j) a tenth positive lens; and
k) an eleventh positive lens.

The optical system proposed has a projection lens having a fixed focal length. This makes it possible to meet the requirements made of a digital projection lens. The lens has outstanding properties with regard to the solving power and a high vertex focal length. The projection lens according to the invention has a minimum lateral chromatic aberration that is less than 2 μm on the DMD side. The lens furthermore has a high telecentricity and very small distortions. This is made possible by the use of a lens having a fixed focal length. Such lenses can surpass zoom lenses in terms of their optical properties. In particular, the disadvantages of a zoom lens at the limit focal lengths, such as a noticeable lateral chromatic aberration, are no longer present.

The projection lens proposed has a smaller volume and weight than a customary zoom projection lens. In the projection of digital image data, a significantly smaller and less expensive anamorphic system can be used since the diameter of the lens is smaller than in the conventional zoom lenses. It can also be produced less expensively than a zoom lens.

In one advantageous embodiment, the projection lens is configured in such a way that the fourth positive optical assembly has two lenses. In this configuration, the projection lens is particularly well suited to focal lengths of between 40 and 50 mm.

In one advantageous embodiment of the invention, the focal length extender is arranged between the sixth negative lens and the seventh positive lens of the projection lens. The fourth positive optical assembly has two lenses in this embodiment.

In another advantageous embodiment, the fourth positive optical assembly of the projection lens has precisely one positive lens. In this configuration, the projection lens is particularly well suited to focal lengths of between 50 and 100 mm.

A diaphragm is advantageously arranged between the sixth negative lens and the seventh positive lens of the projection lens. In one advantageous embodiment of the invention, the diaphragm is a fixed diaphragm that results in an F-number of 2.5. The diaphragm is adapted to the emission angle or the maximum tilting of the individual mirrors of the DMD.

At least one negative lens in front of the diaphragm is advantageously formed from fluor crown, high-refractive-index heavy flint or CaF2 (calcium fluoride), while behind the diaphragm at least one positive lens is likewise formed from said materials. The shorter the focal length of the lens, the more lenses there are formed from the materials mentioned. At focal lengths of greater than 60 mm it is possible to use other materials for the negative lens in front of the diaphragm.

The projection lens according to the invention thus has a suitable defined longitudinal chromatic aberration since the red DMD is arranged 45 μm further away from the lens than the green DMD, and the blue DMD 15 μm further away than the green DMD.

The diaphragm (fixed diaphragm) originally present in the lens is pivoted out and in return the extender having its own diaphragm is pivoted in. The diaphragm reduces the existing scattered light. As a result of the focal length extender being pivoted in, the F-number of the lens is likewise increased by a factor of 1.25, but the image is correspondingly reduced. With the application of the focal length extender, the brightness on the screen therefore remains identical in comparison with the brightness without a focal length extender. This is a further advantage of the proposed fixed focal length projection lens over the customary zoom lenses.

A cinema operator is not obliged to use a focal length extender. Instead of the focal length extender, letterboxing can be set instead at the digital projector. The focal length can then remain unchanged in specific configurations (see table 12) and it is thus possible to work without a focal length extender.

Therefore, the invention furthermore includes various projection lenses for the projection of digital image data with in each case a fixed focal length.

Firstly, this is a projection lens for the projection of digital image data, which has the following elements in the order specified, as viewed from a projection wall:
a) a first negative lens;
b) a second negative lens;
c) a third negative lens;
d) a fourth positive optical assembly having two lenses;
e) a fifth positive lens;
f) a sixth negative lens;
g) a seventh lens;
h) an eighth lens;
i) a ninth negative lens;
j) a tenth positive lens; and
k) an eleventh positive lens.

Advantageously, this projection lens has a diaphragm between the sixth negative lens and the seventh positive lens. At least one negative lens in front of the diaphragm is formed from fluor crown or high-refractive-index heavy flint or CaF2. Furthermore, at least one positive lens behind the diaphragm is formed from fluor crown or high-refractive-index heavy flint or CaF2.

Secondly, the invention concerns a projection lens for the projection of digital image data, which has the following elements in the order specified, as viewed from a projection wall:
a) a first negative lens;
b) a second negative lens;
c) a third negative lens;
d) a fourth positive lens;
e) a fifth positive lens;
f) a sixth negative lens;
g) a diaphragm;

h) a seventh lens;
i) an eighth lens;
j) a ninth negative lens;
k) a tenth positive lens; and
l) an eleventh positive lens;

wherein at least one negative lens in front of the diaphragm is formed from fluor crown or high-refractive-index heavy flint or CaF2; and wherein at least one positive lens behind the diaphragm is formed from fluor crown or high-refractive-index heavy flint or CaF2.

Projection lenses having partly corresponding features can already be found in U.S. Pat. No. 6,188,523 B1.

Further details and features will become apparent from the following description of preferred exemplary embodiments in conjunction with the subclaims. In this case, the respective features can be realized by themselves or as a plurality in combination with one another. The possibilities for achieving the object are not restricted to the exemplary embodiments. Thus, indications of ranges for example always encompass all intermediate values—not stated—and all conceivable sub-intervals.

The exemplary embodiments are illustrated schematically in the figures. Identical reference numerals in the individual figures in this case designate elements which are identical or functionally identical or correspond to one another with regard to their functions. In the figures, specifically:

Figure 1A:
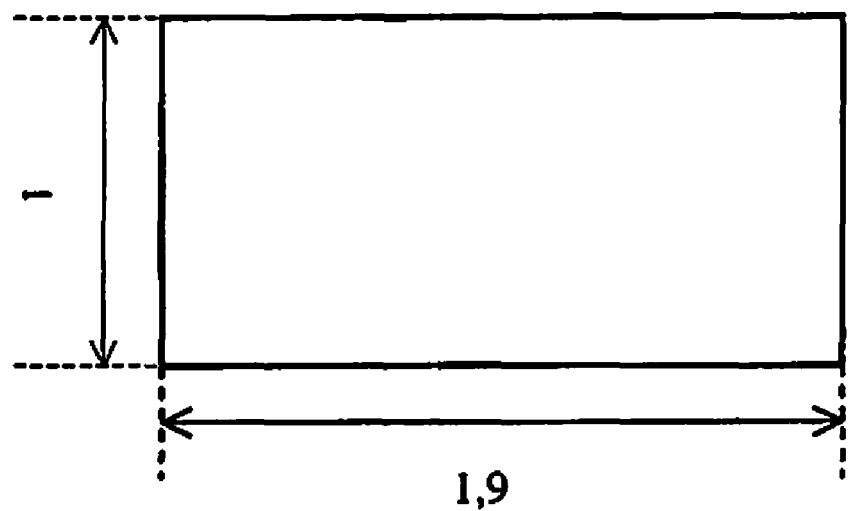
FIG. 1A shows a schematic illustration of the format 1.9:1.
Figure 1B:
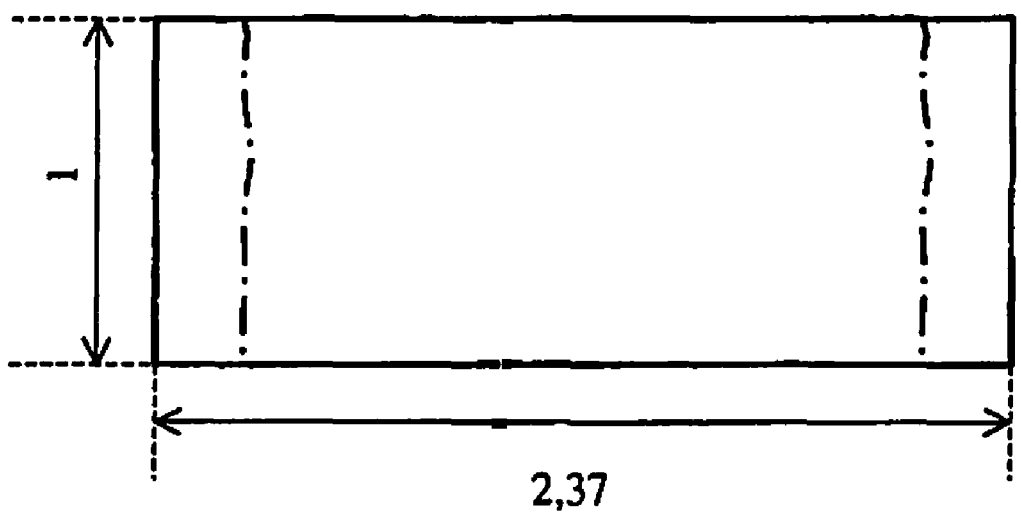
FIG. 1B shows a schematic illustration of the format 2.37:1 on the cinema screen with a constant image height.
Figure 1C:
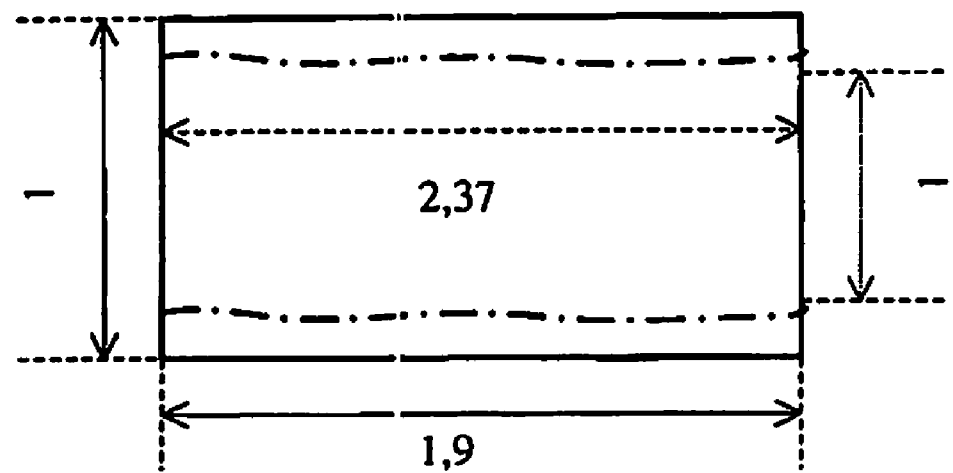
FIG. 1C shows a schematic illustration of the format 2.37:1 on the cinema screen with a constant image width.
Figure 1D:
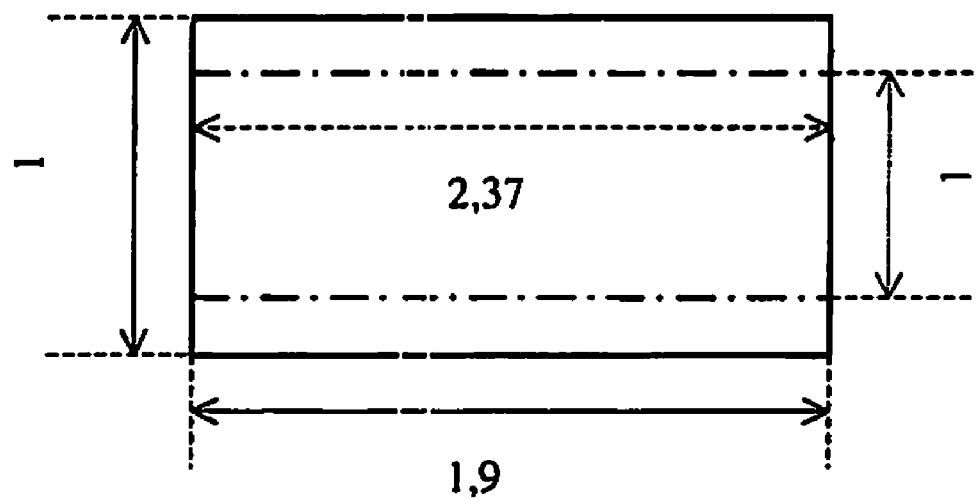
FIG. 1D shows a schematic illustration of the formats 1.9:1 and 2.37:1 on the DMD in the case of letterboxing.
Figure 2:
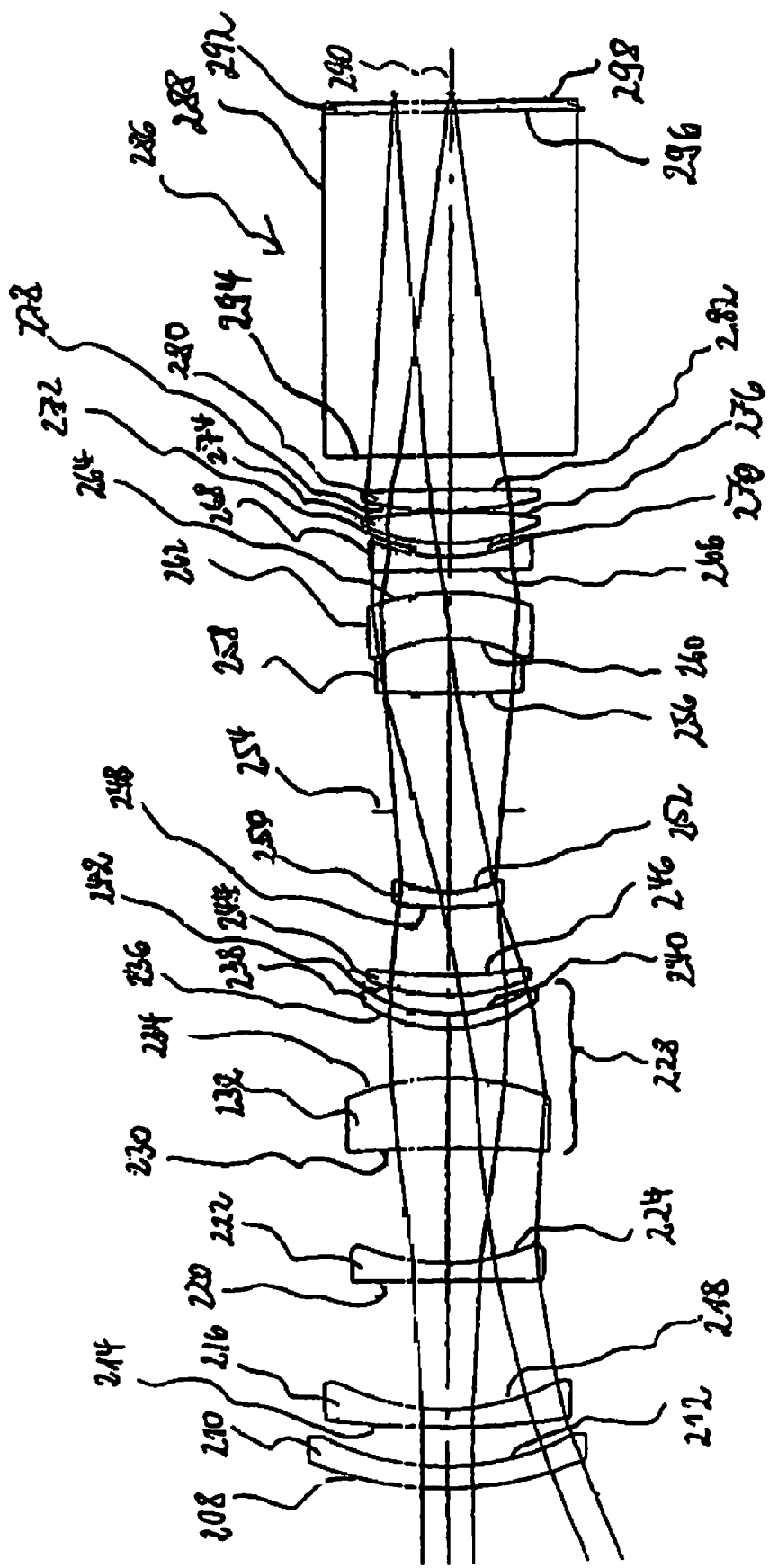
FIG. 2 shows, as a first exemplary embodiment, a lens arrangement of a projection lens having a focal length of 44 mm.
Figure 7:
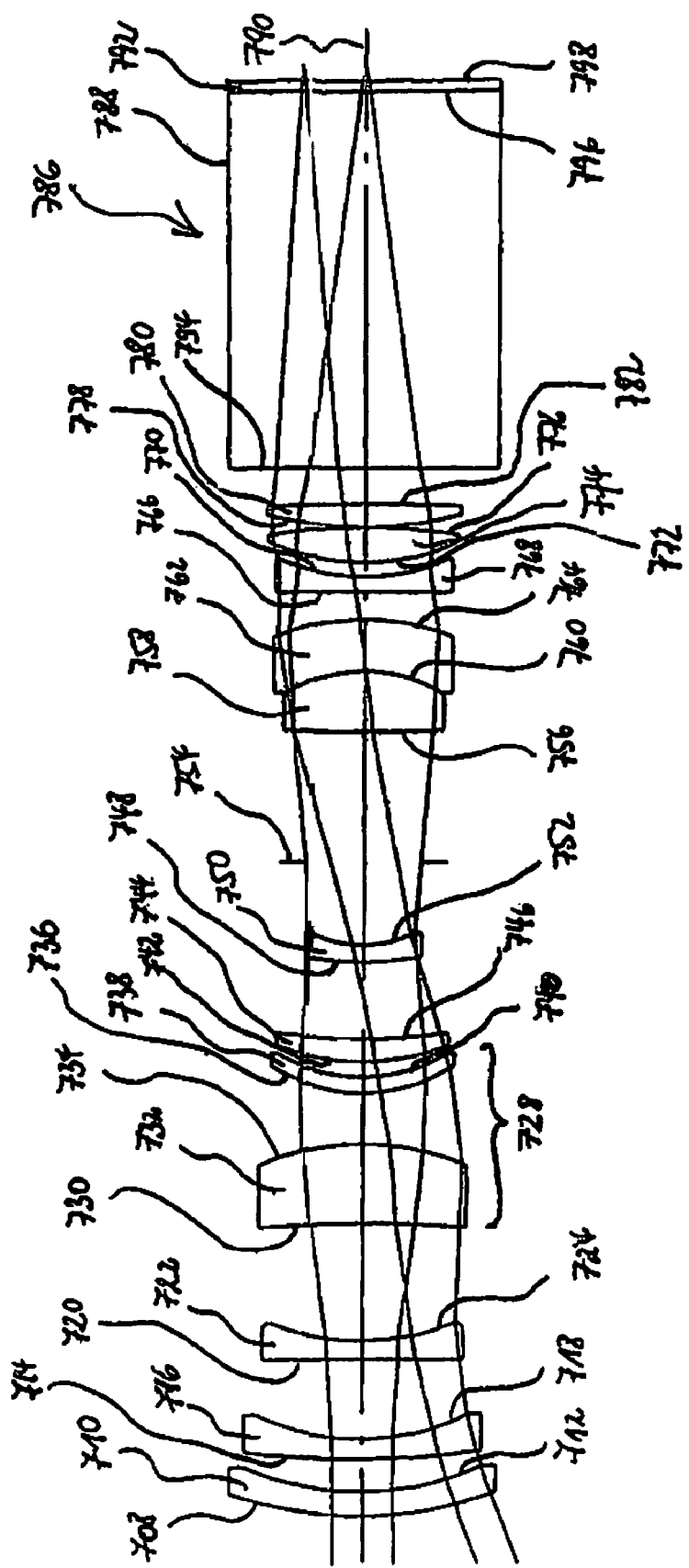
FIG. 7 shows, as a second exemplary embodiment, a lens arrangement of a projection lens having a focal length of 48 mm.
Figure 8:
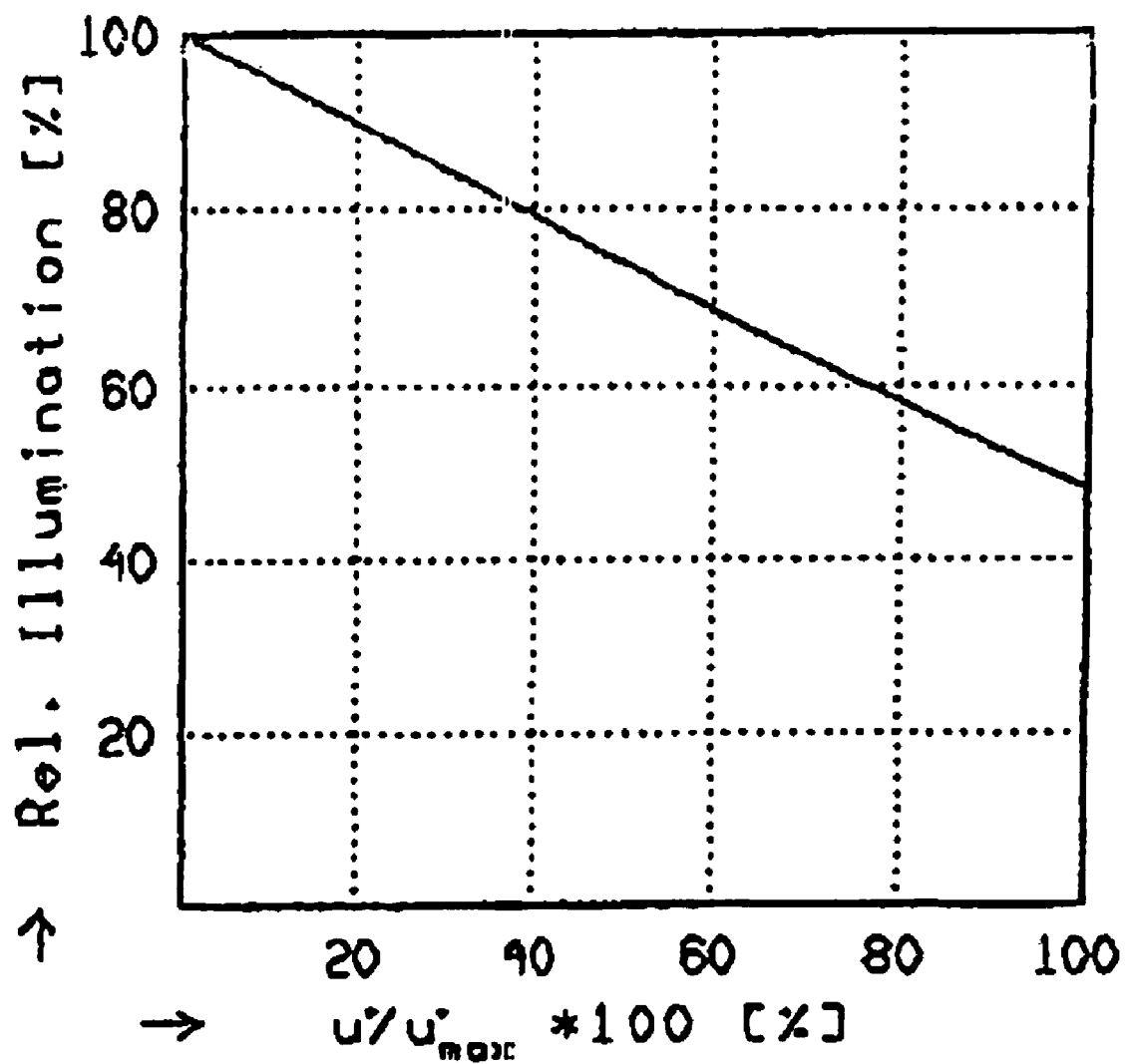
FIG. 8 shows the relative illumination of the projection lens in accordance with FIG. 7.
Figure 12:
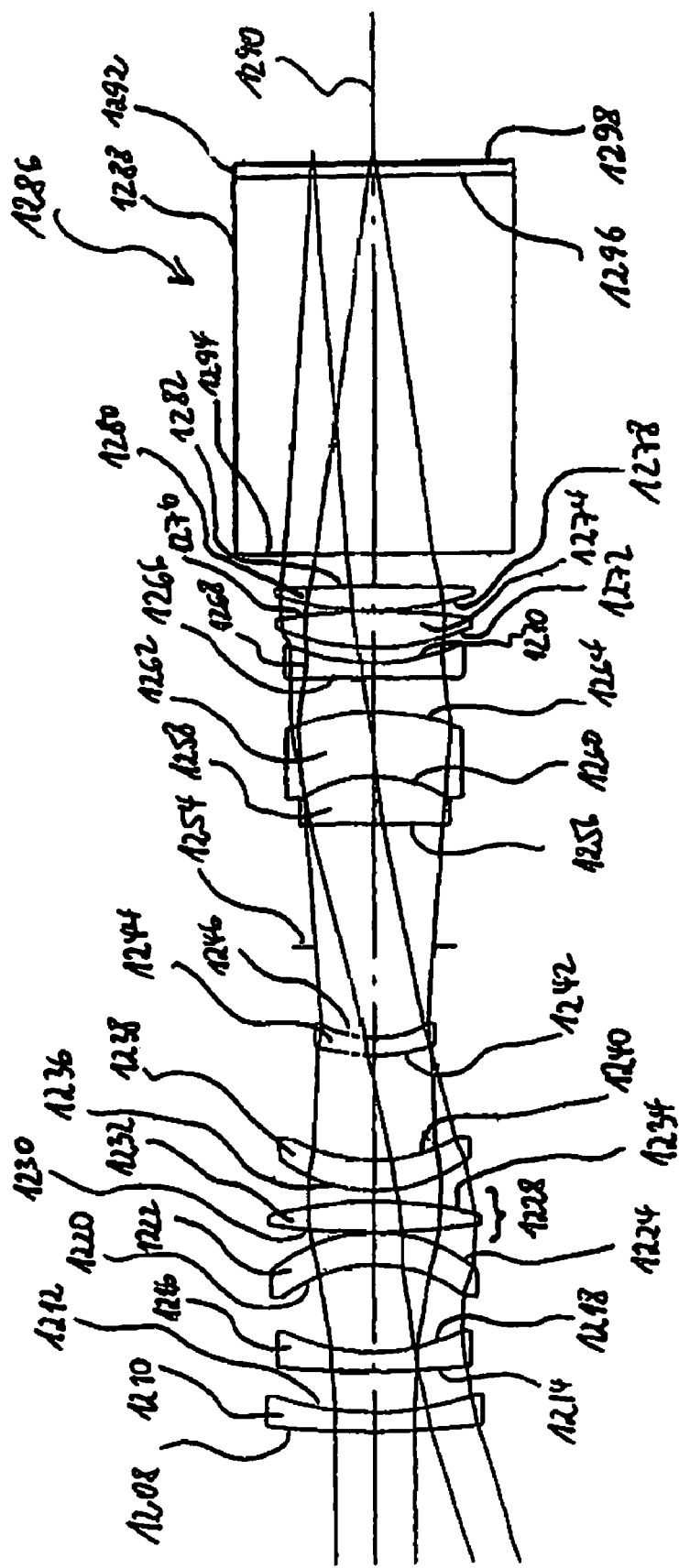
FIG. 12 shows, as a third exemplary embodiment, a lens arrangement of a projection lens having a focal length of 60 mm.
Figure 13:
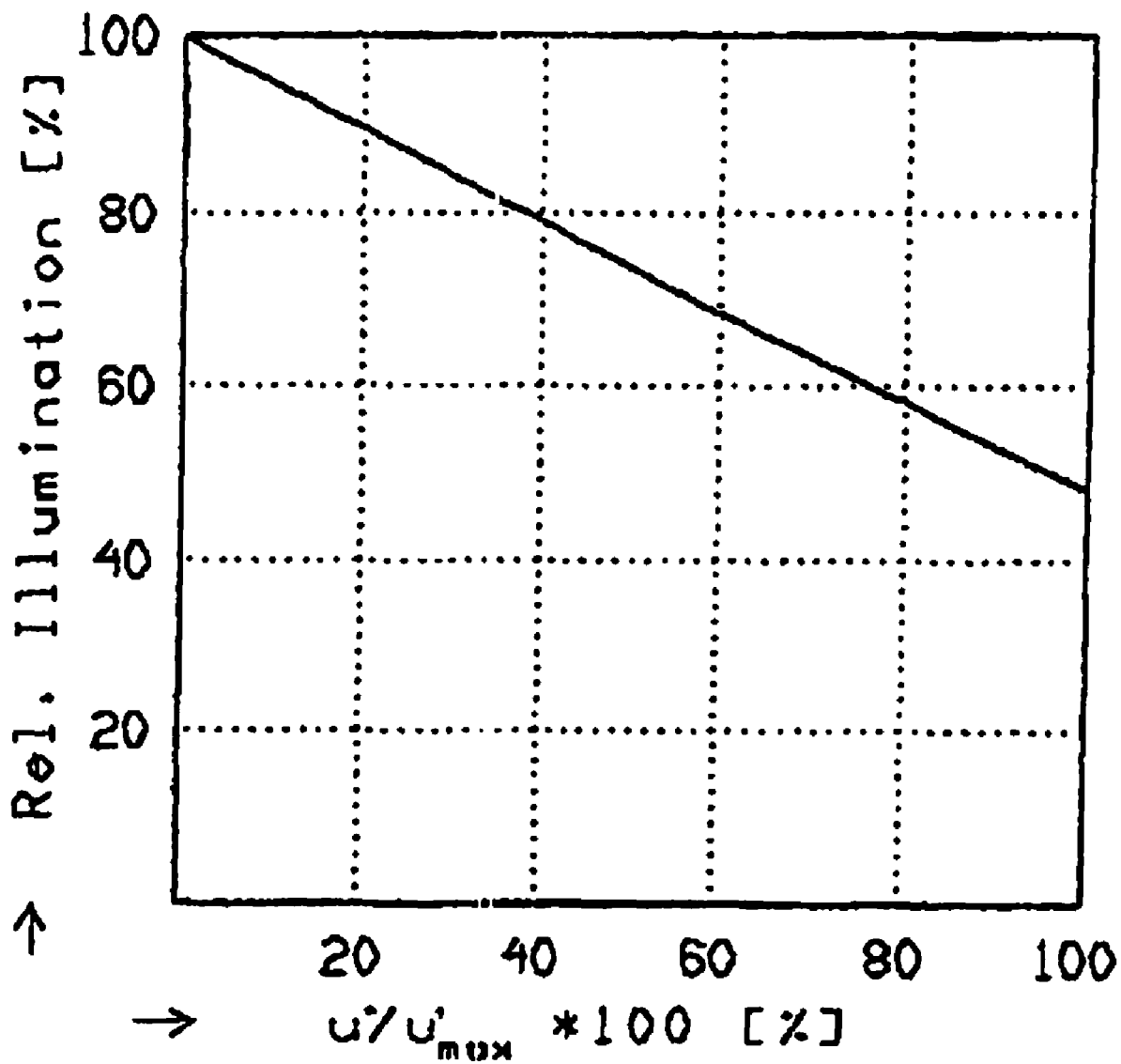
FIG. 13 shows the relative illumination of the projection lens in accordance with FIG. 12.
Figure 14:
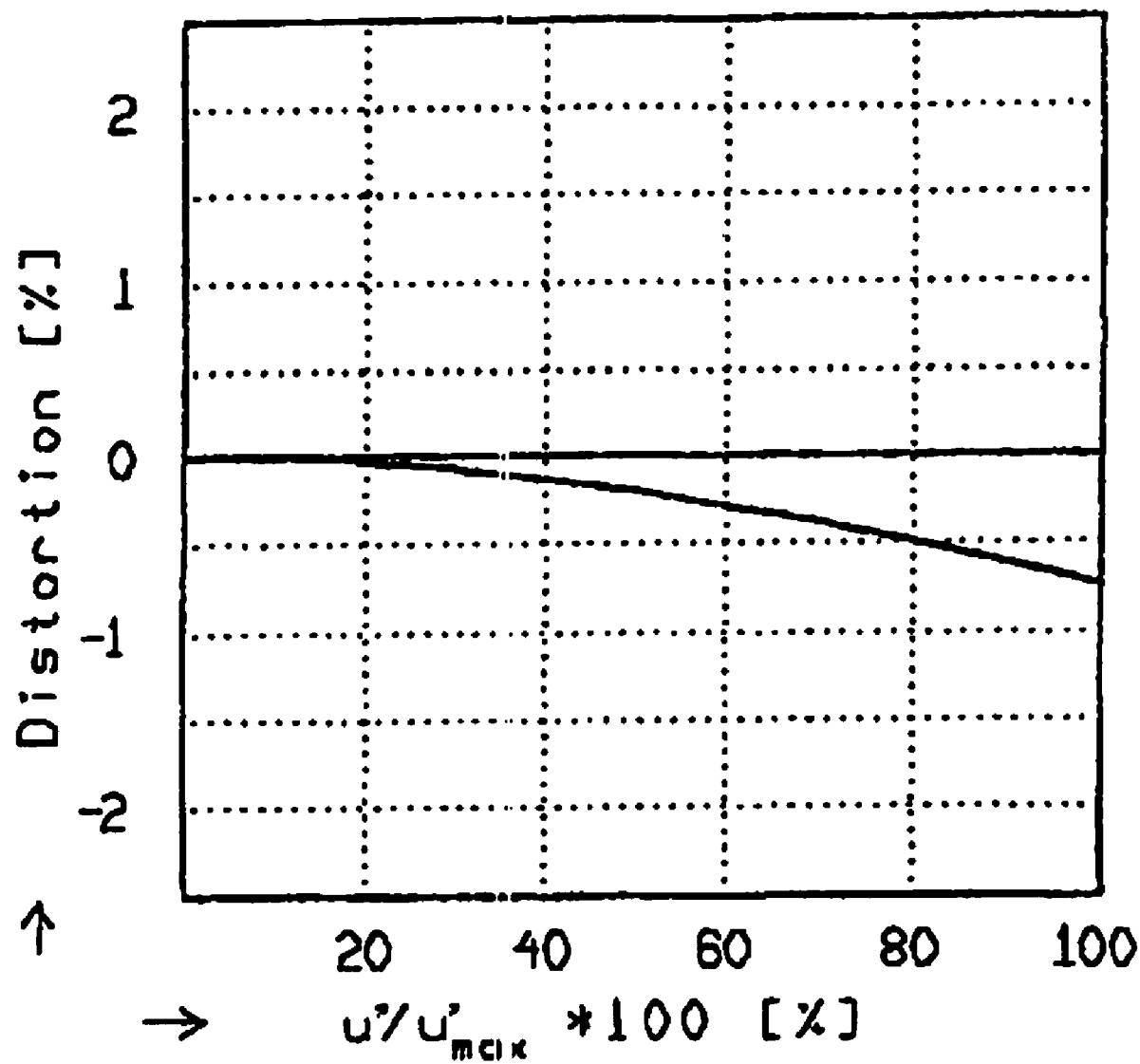
FIG. 14 shows the distortion of the projection lens in accordance with FIG. 12.
Figure 15:
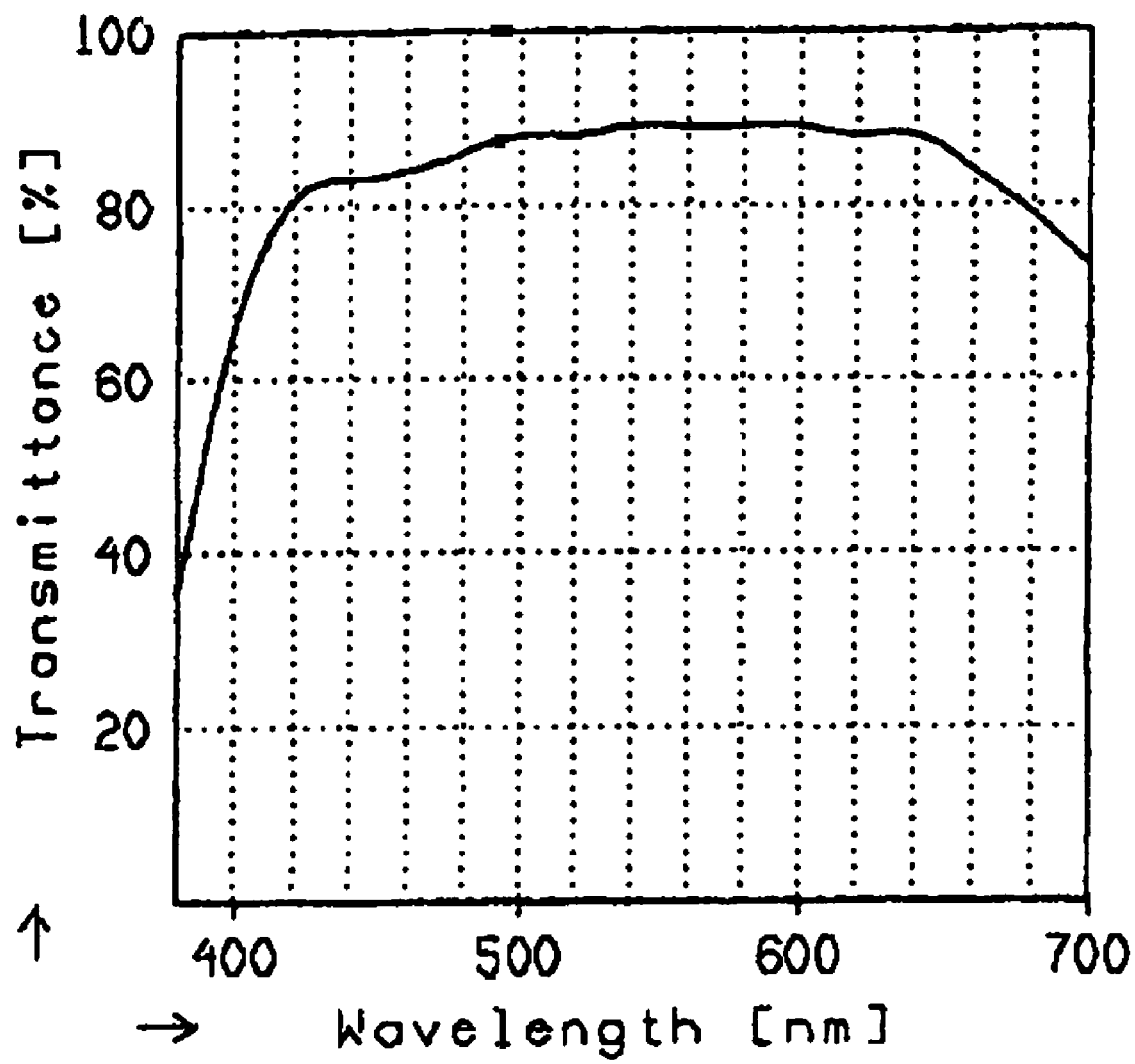
FIG. 15 shows the transmittance of the projection lens in accordance with FIG. 12.
Figure 17:
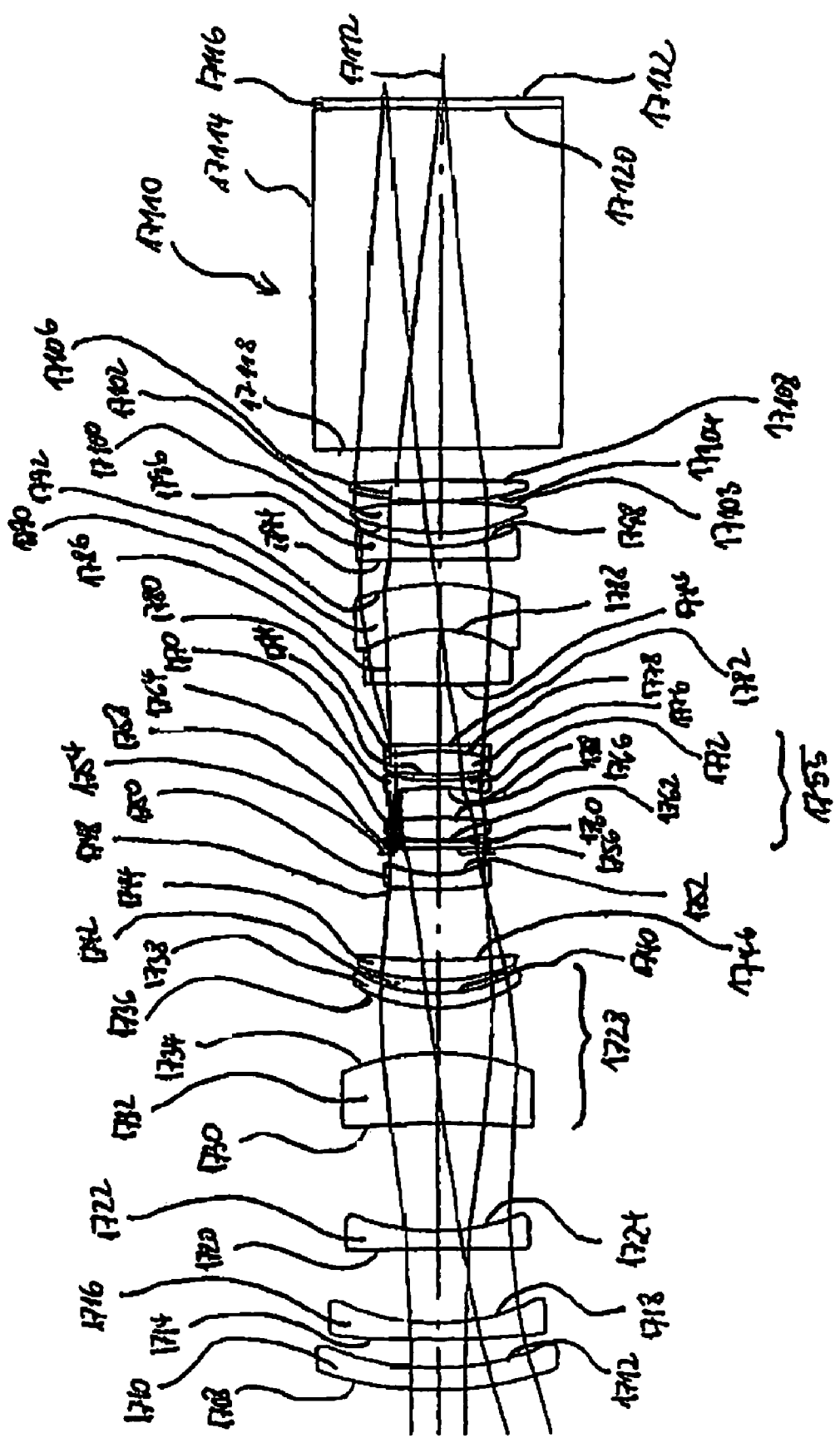
FIG. 17 shows, as a fourth exemplary embodiment, a lens arrangement of a projection lens having a focal length of 48 mm and a focal length extender.
Figure 18:
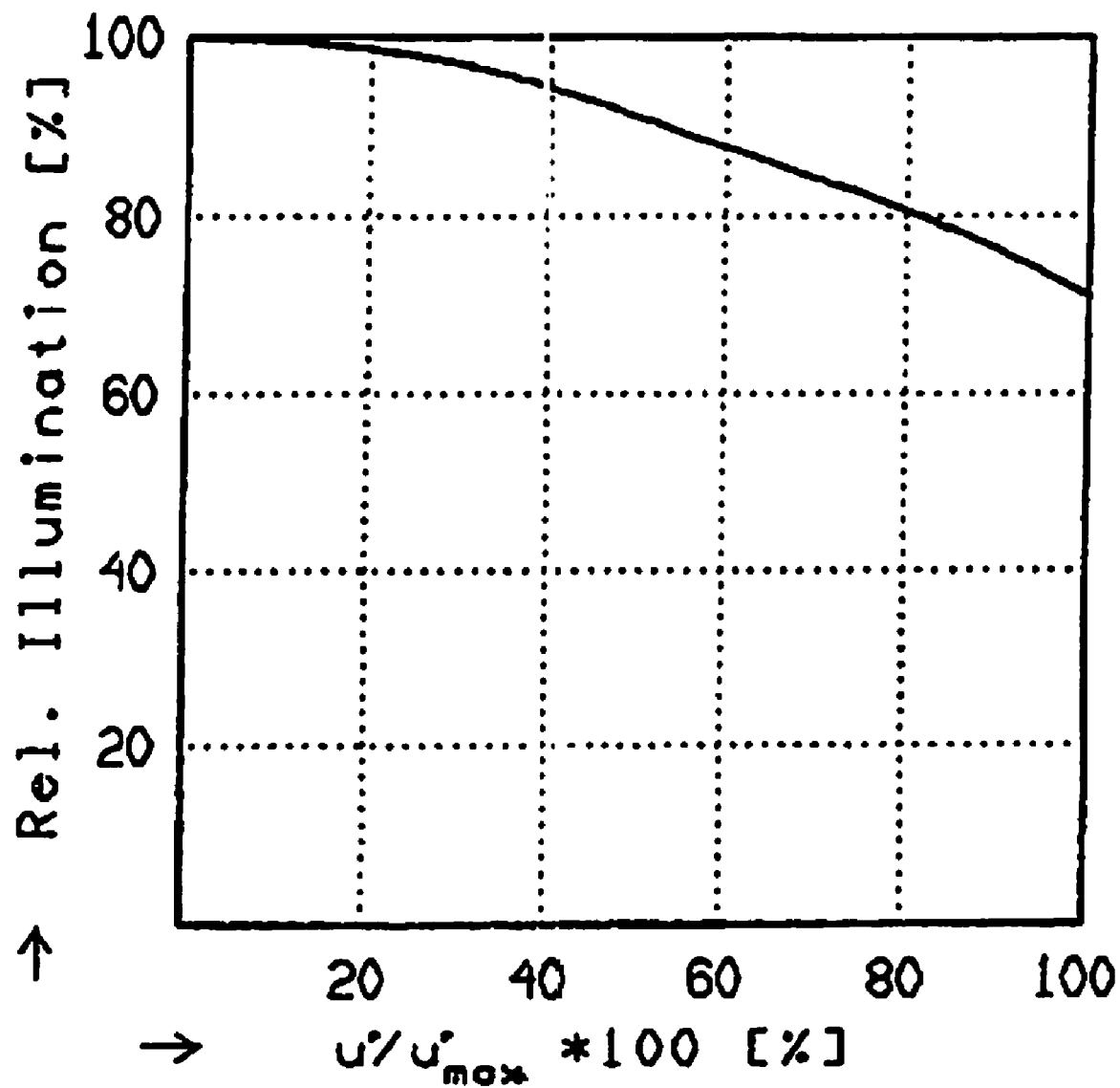
FIG. 18 shows the relative illumination of the projection lens in accordance with FIG. 17.
Figure 19:
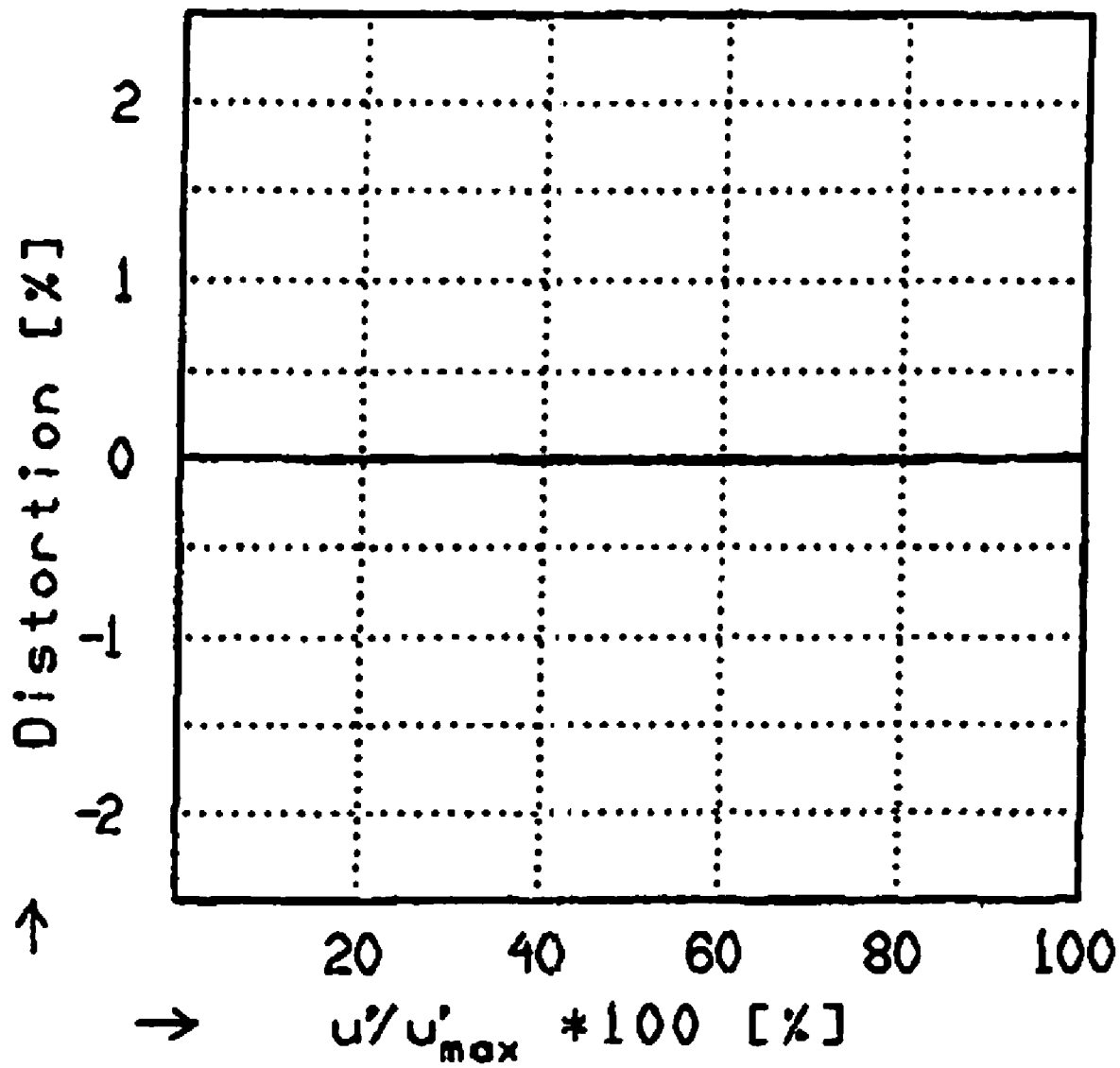
FIG. 19 shows the distortion of the projection lens in accordance with FIG. 17.
Figure 20:
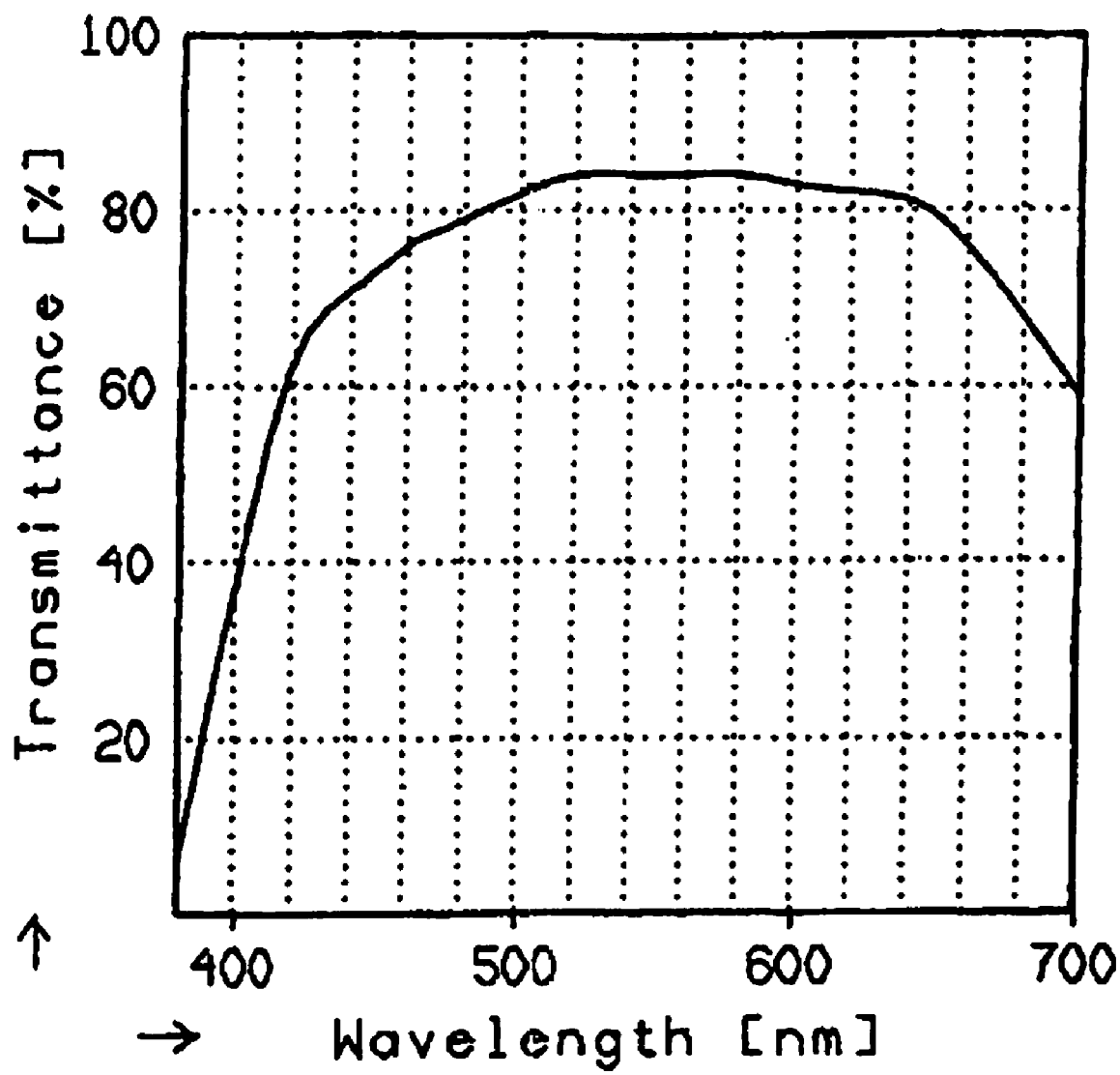
FIG. 20 shows the transmittance of the projection lens in accordance with FIG. 17.
Figure 22:
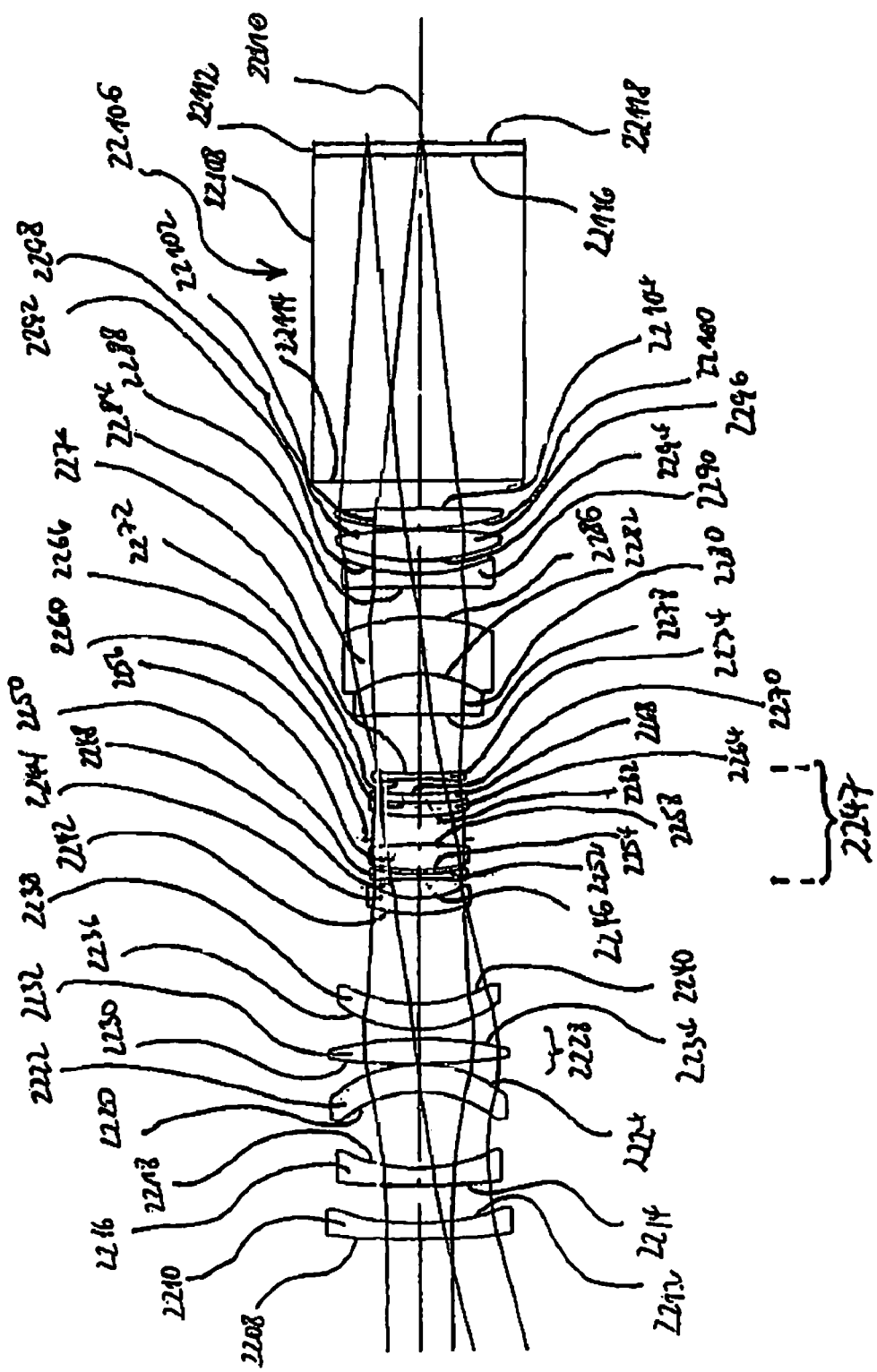
FIG. 22 shows, as a fifth exemplary embodiment, a lens arrangement of a projection lens having a focal length of 60 mm and a focal length extender.
Figure 23:
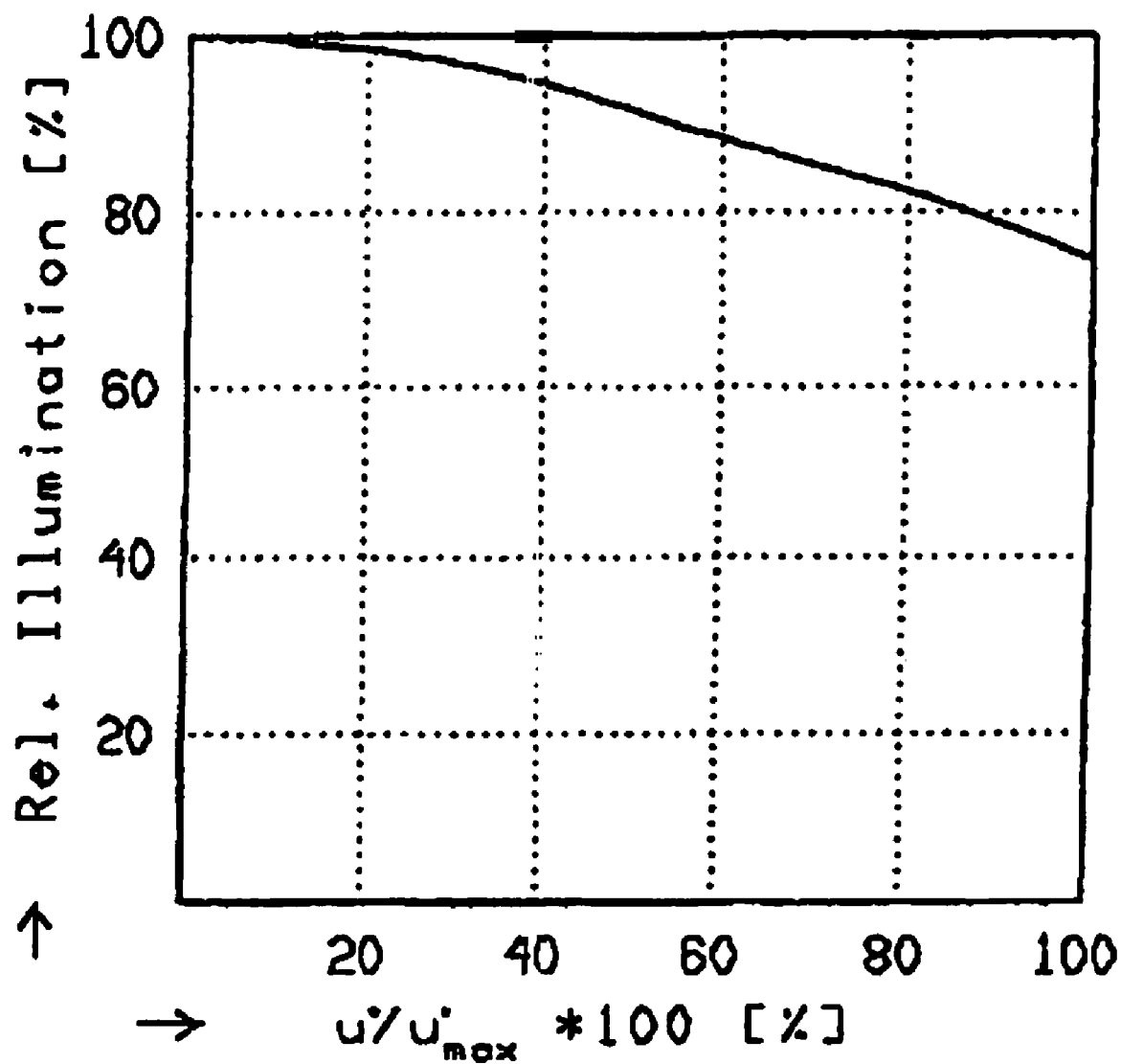
FIG. 23 shows the relative illumination of the projection lens in accordance with FIG. 22.
Figure 24:
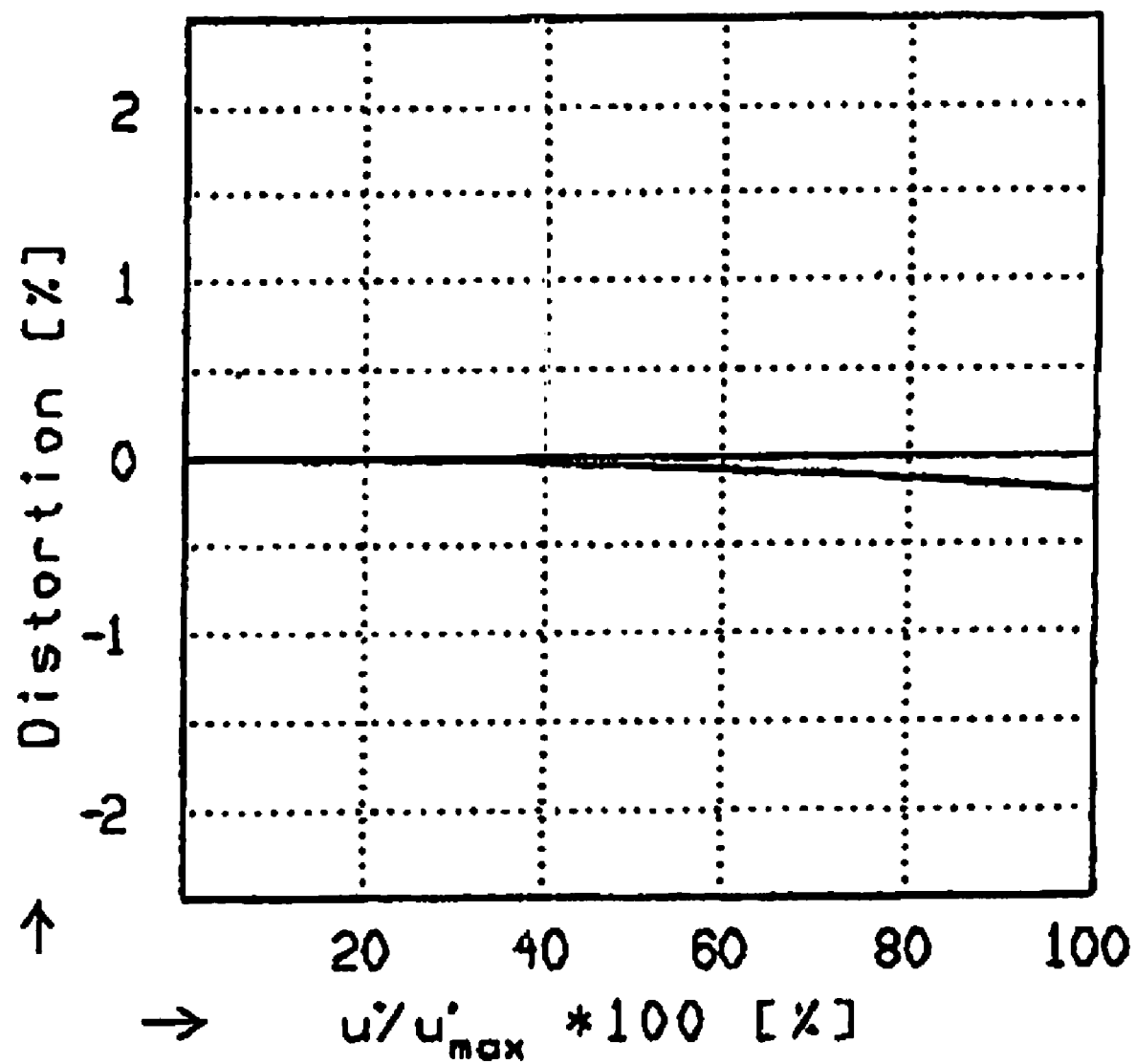
FIG. 24 shows the distortion of the projection lens in accordance with FIG. 22.
Figure 25:
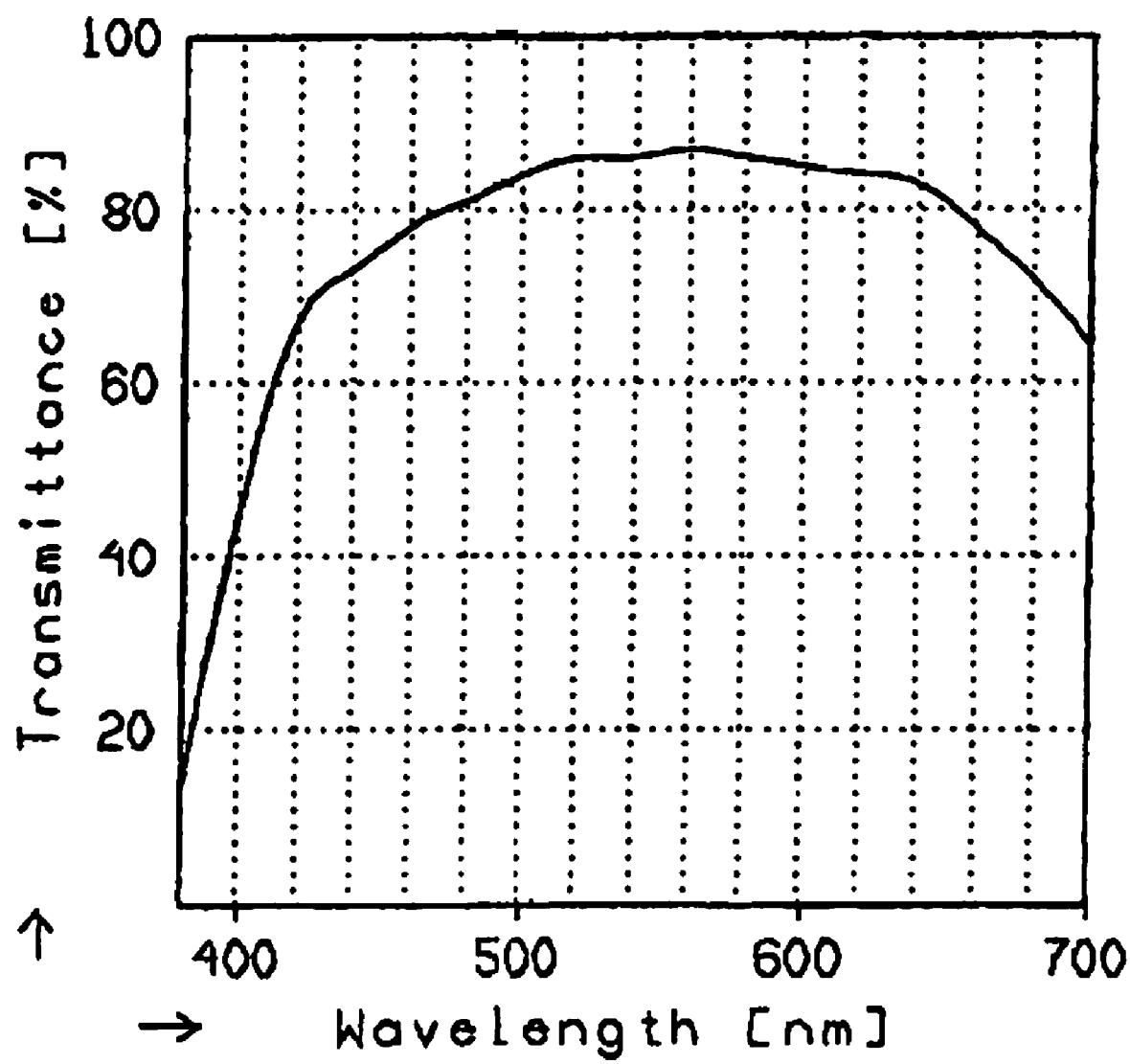
FIG. 25 shows the transmittance of the projection lens in accordance with FIG. 22.

The technical data of the projection lenses illustrated in the figures are listed in tables 1 to 10. In the tables, specifically:

table 1 shows a list of the radii, the thicknesses or air clearances, the refractive indices and the Abbé numbers of the projection lens illustrated in FIG. 2;

table 2 shows a list of the aspheric coefficients of the projection lens illustrated in FIG. 2;

table 3 shows a list of the radii, the thicknesses or air clearances, the refractive indices and the Abbé numbers of the projection lens illustrated in FIG. 7;

table 4 shows a list of the aspheric coefficients of the projection lens illustrated in FIG. 7;

table 5 shows a list of the radii, the thicknesses or air clearances, the refractive indices and the Abbé numbers of the projection lens illustrated in FIG. 12;

table 6 shows a list of the aspheric coefficients of the projection lens illustrated in FIG. 12;

table 7 shows a list of the radii, the thicknesses or air clearances, the refractive indices and the Abbé numbers of the projection lens illustrated in FIG. 17;

table 8 shows a list of the aspheric coefficients of the projection lens illustrated in FIG. 17;

table 9 shows a list of the radii, the thicknesses or air clearances, the refractive indices and the Abbé numbers of the projection lens illustrated in FIG. 22;

table 10 shows a list of the aspheric coefficients of the projection lens illustrated in FIG. 22.

Exemplary Embodiments 1 and 2

Exemplary embodiments 1 and 2, the lens arrangements of which are illustrated in FIGS. 2 and 7, represent examples which have the same basic construction but which differ with regard to their focal length.

The first exemplary embodiment illustrated in FIG. 2 concerns a projection lens having a focal length of 44 mm and an F-number of 2.5. The projection lens according to the construction illustrated in FIG. 7 has a focal length of 48 mm and an f-number of 2.5.

In the illustrations in accordance with FIG. 2 and FIG. 7, in each case the projection wall or the magnified image is situated on the left and the object or the digital image medium is situated on the right. In the two exemplary embodiments, the projection lens comprises the following elements, in the order from the screen to the DMD, that is to say from left to right:

a) a first negative meniscus lens 210 and respectively 710, the concave surface 212 and respectively 712 of which is remote from the projection wall;

b) a second negative meniscus lens 216 and respectively 716, the concave surface 218 and respectively 718 of which is remote from the projection wall;

c) a third negative biconcave lens 222 and respectively 722, the flatter concave surface 220 and respectively 720 of which faces the projection wall;

d) a fourth positive optical assembly 228 and respectively 728 having a first positive meniscus lens 232 and respectively 732 and a second meniscus lens 238 and respectively 738, wherein the convex surface 230 and respectively 730 of the first positive meniscus lens 232 and respectively 732 of the positive optical assembly 228 and respectively 728 is remote from the projection wall, while the convex surface 236 and respectively 736 of the second meniscus lens 238 and respectively 738 of the positive optical assembly 228 and respectively 728 faces the projection wall;

e) a fifth positive meniscus lens 244 and respectively 744, a convex surface 242 and respectively 742 of which faces the projection wall;

f) a sixth negative meniscus lens 250 and respectively 750, the concave surface 252 and respectively 752 of which is configured in aspherical fashion and is remote from the projection wall; the surface 248 and respectively 748 facing the projection wall can also be chosen as an aspherical surface; one variant also dispenses with an aspherical surface;

g) a diaphragm 254 and respectively 754;

h) a seventh positive biconvex lens 258 and respectively 758, the flatter surface 256 and respectively 756 of which faces the projection wall;

i) an eighth negative meniscus lens 262 and respectively 762, the concave surface 260 and respectively 760 of which faces the projection wall;

j) a ninth negative biconcave lens 268 and respectively 768, the flatter concave face 266 and respectively 766 of which faces the projection wall;

k) a tenth positive biconvex lens 274 and respectively 774, the more greatly curved face 272 and respectively 772 of which faces the projection wall;

l) an eleventh positive biconvex lens 280 and respectively 780, the more greatly curved face 278 and respectively 778 of which faces the projection wall.

The lenses 258 and 262 and respectively 758 and 762 are cemented together and form a doublet.

Behind the projection lens as viewed from the projection wall there follows an optically equivalent model of a beam combiner 286 and respectively 786 having an optical axis 290 and respectively 790. The beam combiner comprises the segments 288 and respectively 788 and 292 and respectively 792. It additionally has a first surface 294 and respectively 794, furthermore an interface 296 and respectively 796 between the two segments, and also a second surface 298 and respectively 798. The optical path lengths within the beam combiner have to be taken into account in the calculation of the optical properties of the lens, for which reason there are differences between the vertex focal length in air and the vertex focal length including beam combiner.

The precise specifications with regard to the individual surfaces of the optical elements of the two exemplary embodiments in accordance with FIG. 2 and FIG. 7 can be found in table 1 and table 3, respectively, together with the respectively associated reference numerals.

The aspheric coefficients of the lens surfaces 252 and respectively 752 of the projection lenses in accordance with FIGS. 2 and 7 are listed in table 2 and table 4. The surface of an aspheric lens can generally be described by the following formula:

$$z = \frac{Cy^2}{1+\sqrt{1-(1+K)\cdot C^2 y^2}} + Dy^4 + Ey^6 + Fy^8 + Gy^{10} + Hy^{12}$$

where z indicates the sagitta (in mm) with respect to the axially perpendicular plane, that is to say the direction of the deviation from the plane perpendicular to the optical axis, i.e. in the direction of the optical axis.

C indicates the so-called vertex curvature. It serves to describe the curvature of a convex or concave lens surface and is calculated from the reciprocal of the radius.

y indicates the distance from the optical axis (in mm). y is a radial coordinate.

K indicates the so-called cone constant.

D, E, F, G represent the so-called aspheric coefficients, which are the coefficients of a polynomial expansion of the function for describing the surface of the asphere.

Some characteristic parameters of the projection lenses in accordance with the first two exemplary embodiments are illustrated graphically in FIGS. 3 to 6 and respectively 8 to 11.

Figure 3:
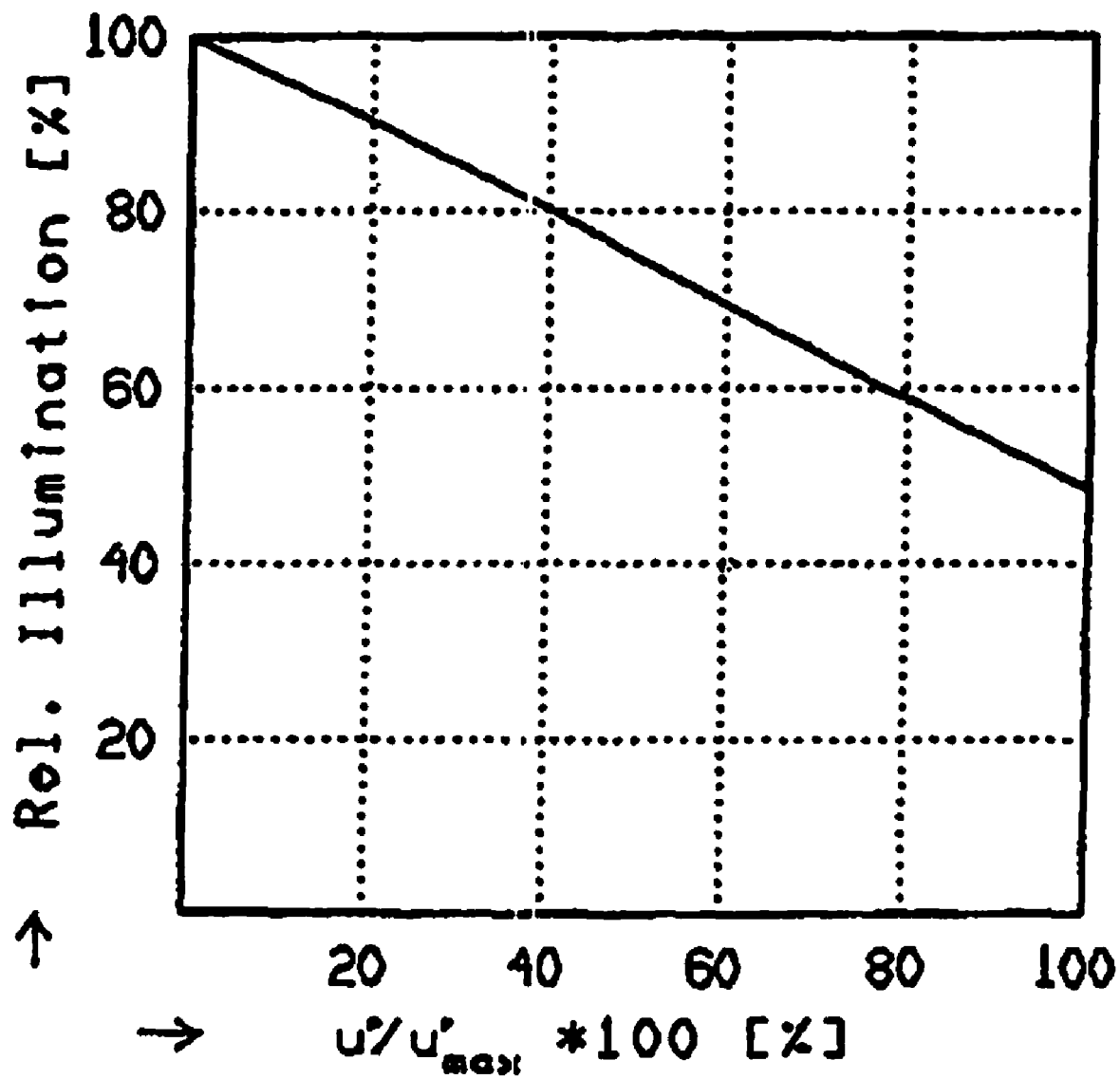
FIG. 3 shows a relative illumination of the projection lens in accordance with FIG. 2.

FIG. 3 and respectively 8 show the relative illumination of the magnified image compared with the center for the projection lens in accordance with the first two exemplary embodiments. The x-axis indicates the relative deviation from the center of the image to be magnified.

Figure 4:
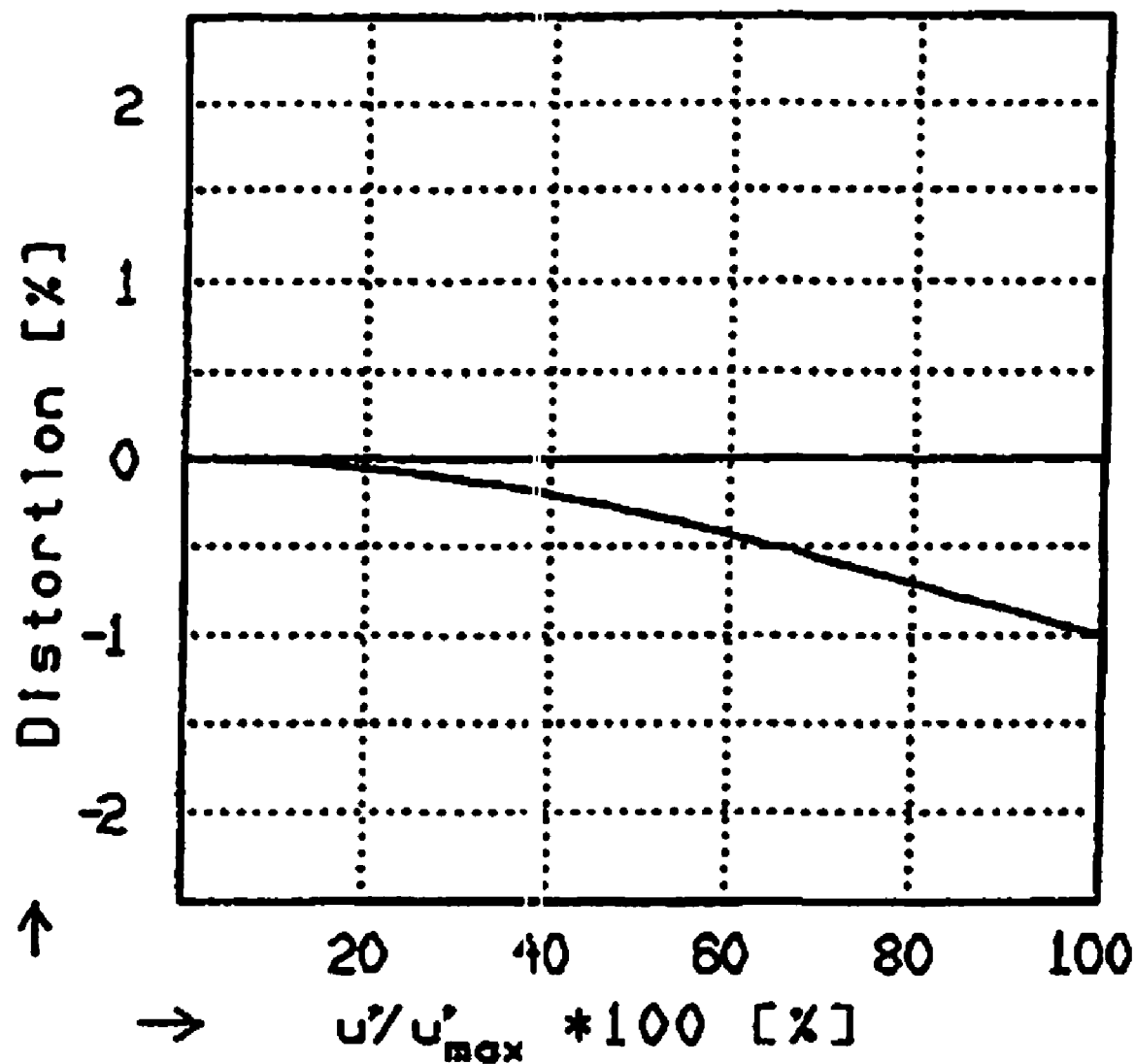
FIG. 4 shows the distortion of the projection lens in accordance with FIG. 2.
Figure 6:
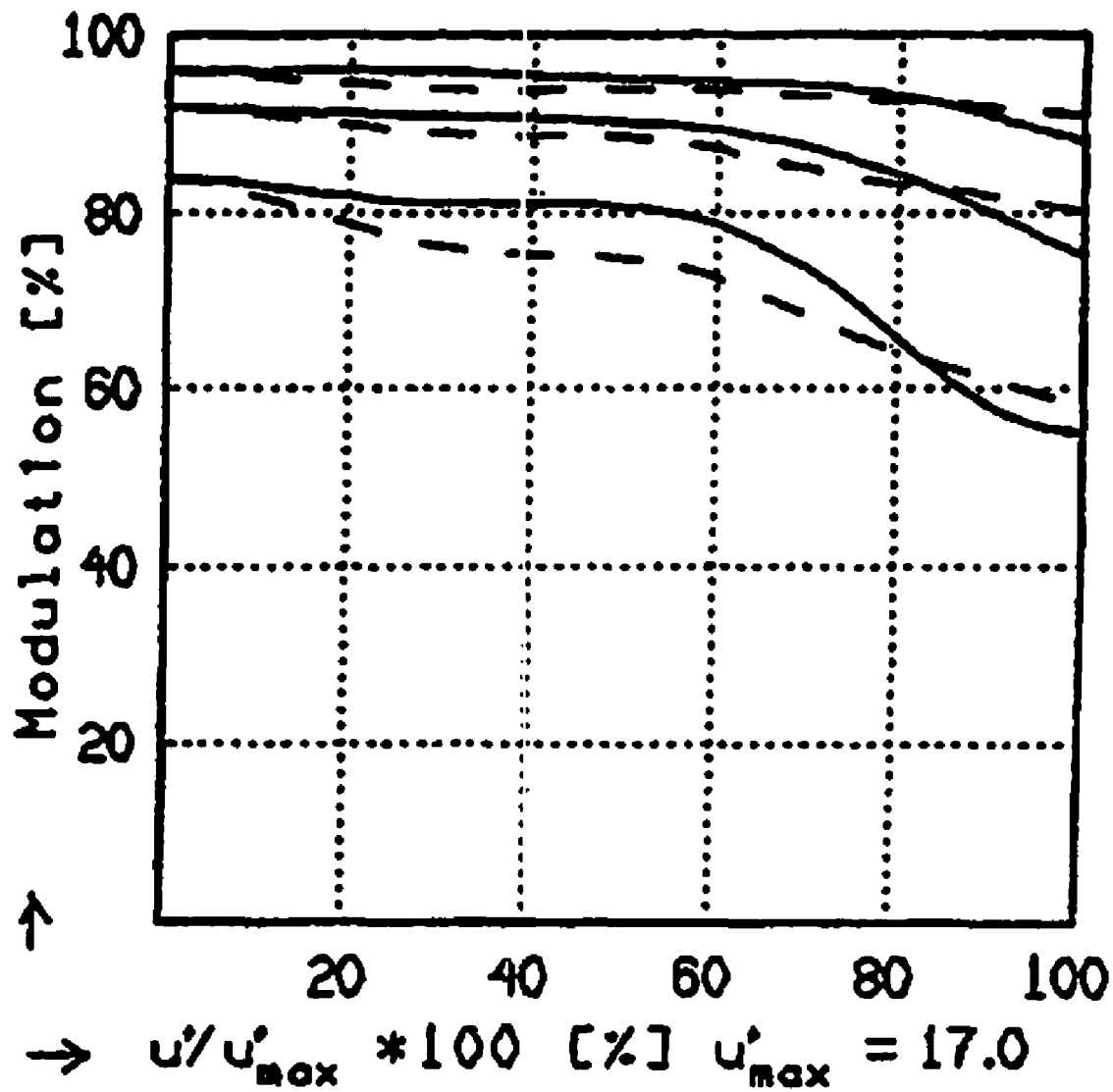
FIG. 6 shows the modulation transfer function of the construction in accordance with FIG. 2 in the green channel for 18, 36 and 72 line pairs per millimeter.
Figure 9:
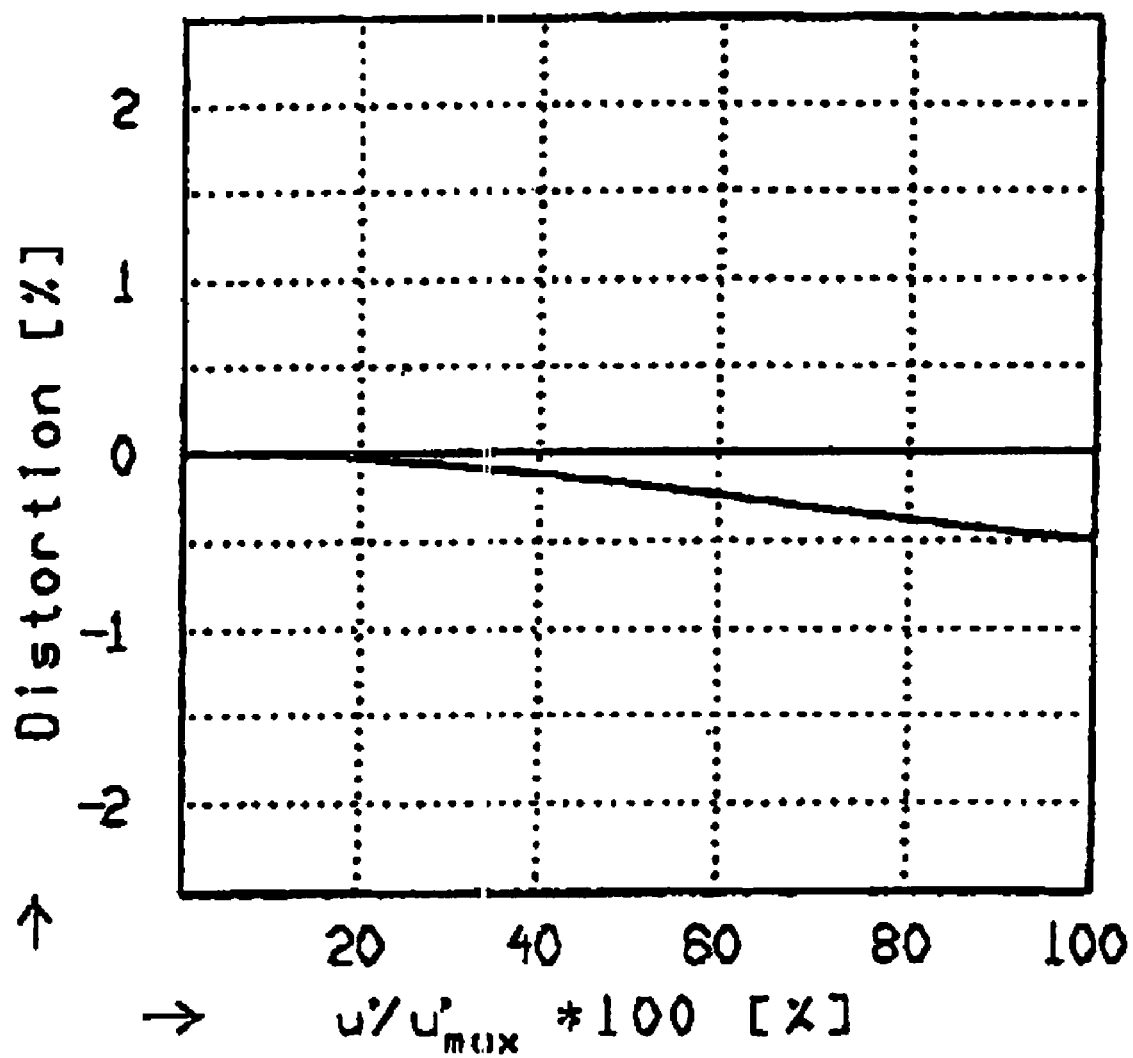
FIG. 9 shows the distortion of the projection lens in accordance with FIG. 7.

FIG. 4 and respectively FIG. 9 show the distortion for the projection lens in accordance with the exemplary embodiments of FIGS. 1 and 6 in percent (%) of the deviation from the ideal image size.

Figure 5:
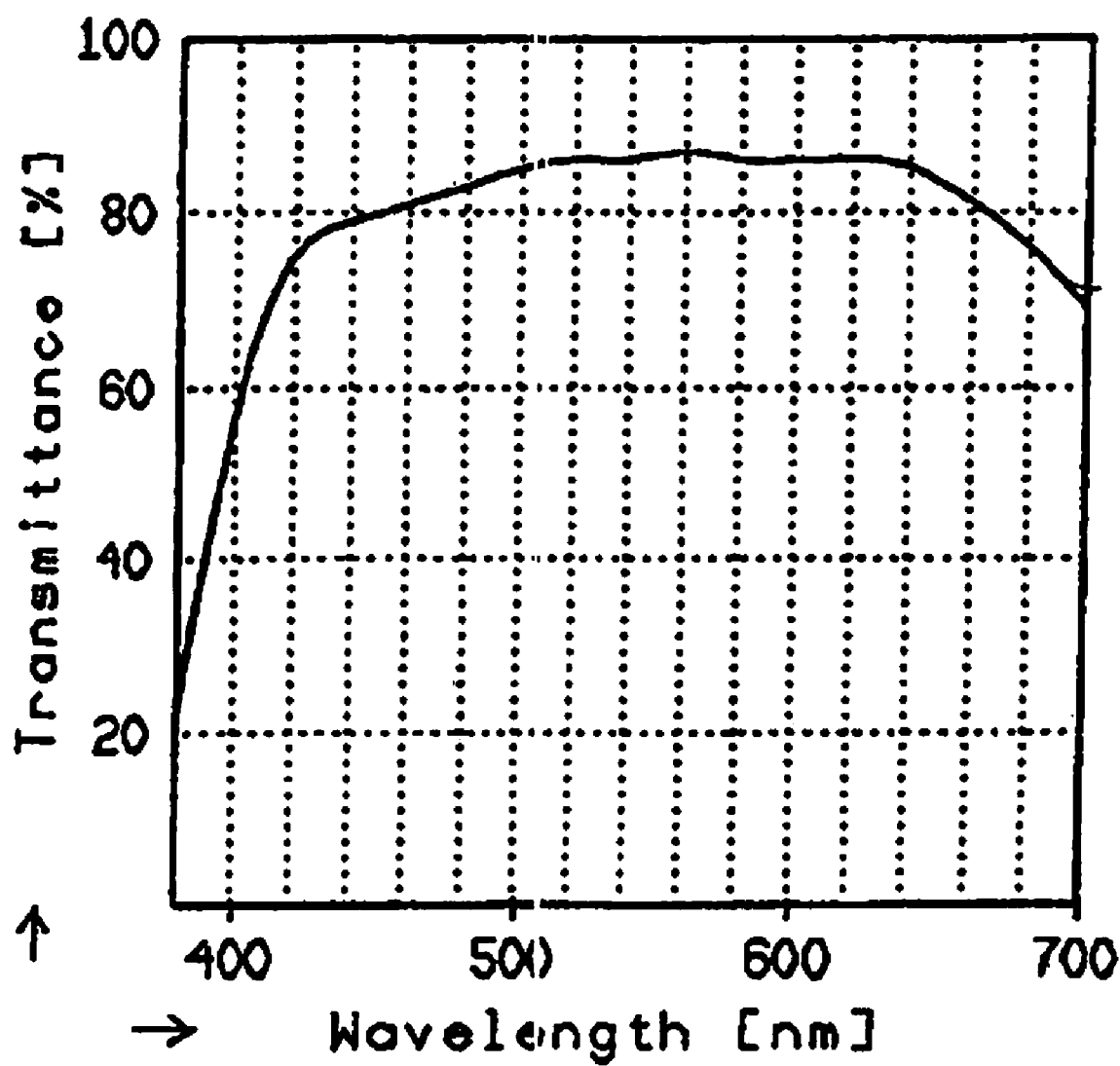
FIG. 5 shows the transmittance of the projection lens in accordance with FIG. 2.
Figure 10:
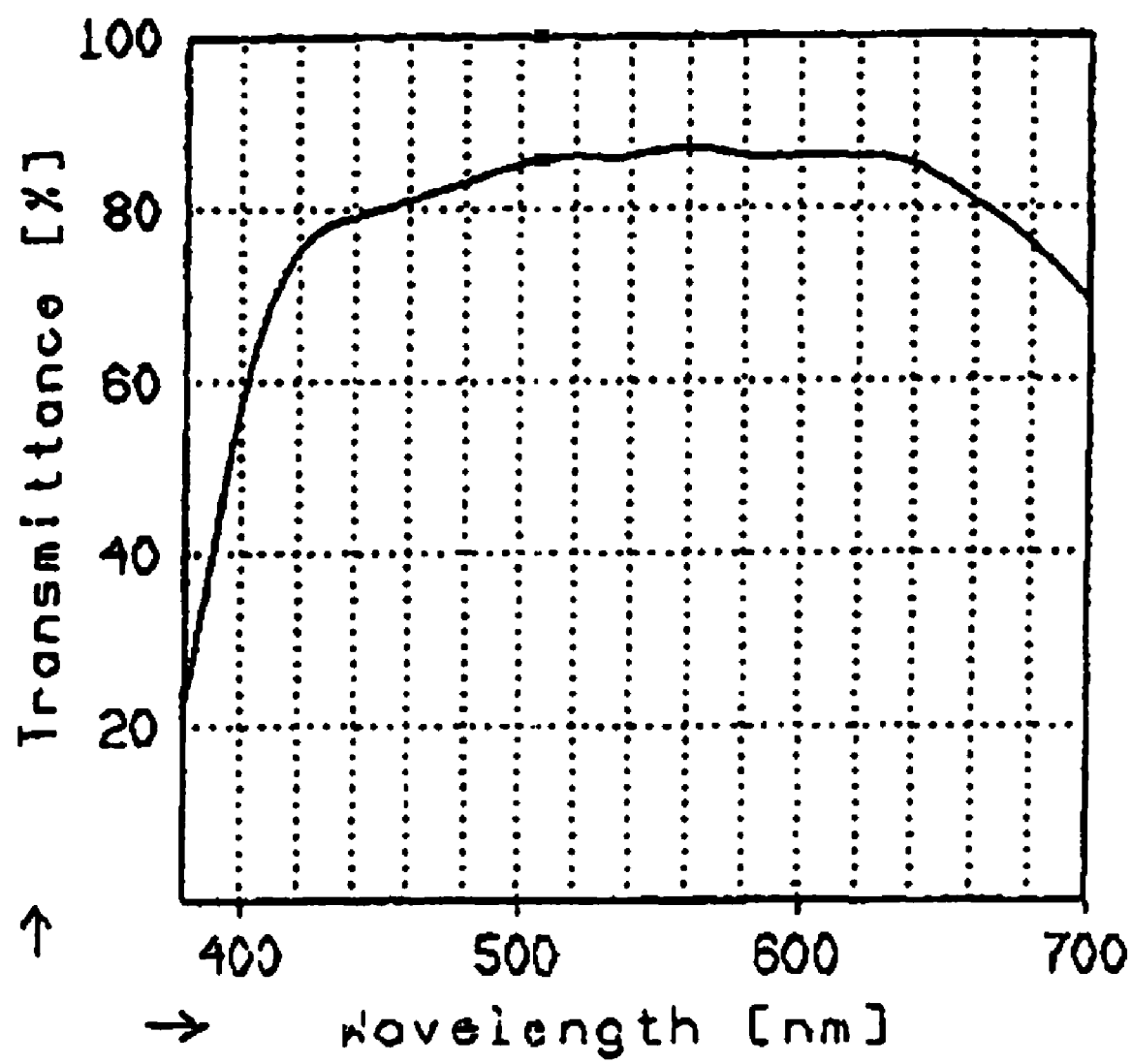
FIG. 10 shows the transmittance of the projection lens in accordance with FIG. 7.

FIG. 5 and respectively FIG. 10 graphically show the profile of the transmittance in percent (%) for the projection lens in accordance with the exemplary embodiments of FIGS. 2 and 7 as a function of the wavelength.

Figure 11:
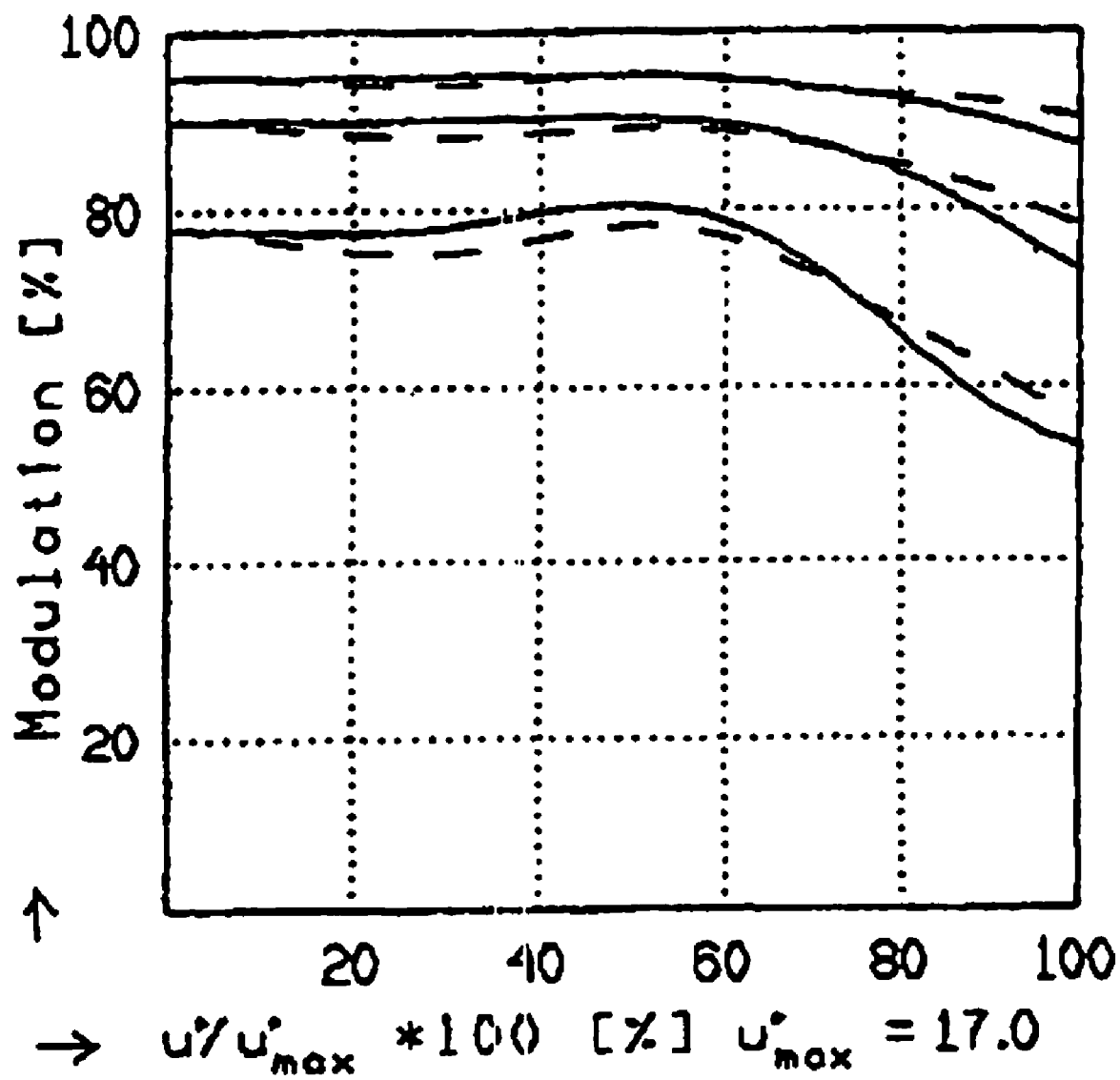
FIG. 11 shows the modulation transfer function of the construction in accordance with FIG. 7 in the green channel for 18, 36 and 72 line pairs per millimeter.

FIG. 6 and respectively FIG. 11 illustrate the resolution (modulation) of the projection lenses from FIG. 2 and respectively FIG. 7. The resolution was calculated in the green channel. The following weighting of the wavelengths was used in this case: 540 nm with 25%, 490 nm with 10%, 500 nm with 15%, 520 nm with 25%, 550 nm with 15% and 560 nm with 10%.

Three examples were calculated: the upper two curves are associated with the example with a spatial frequency of 18 line pairs per mm (LP/mm), the middle two curves are associated with 36 LP/mm and the lower two curves with 72 LP/mm. The solid line in each case shows the resolution of radially running line pairs, and the dashed line the resolution of tangentially running line pairs. The x-axis indicates the relative deviation from the center of the DMD. The modulation transfer function for an F-number k of 2.5 is represented in the y-axis. The modulation M at a location is calculated in accordance with:

$$M = \frac{I_{max} - I_{min}}{I_{max} + I_{min}}$$

where $I_{max}$ and $I_{min}$ are the light intensity of the image of the line pairs at the maximum and minimum, respectively. 15 m was represented as imaging distance. The resolution of the projection lenses in accordance with the first two exemplary embodiments corresponds to the resolution of very good projection lenses.

Exemplary Embodiment 3

The third exemplary embodiment illustrated in FIG. 12 concerns a projection lens having a focal length of 60 mm and an F-number of likewise 2.5. In this exemplary embodiment in accordance with FIG. 12, the projection lens has an altered construction with respect to the first two exemplary embodiments.

In the third advantageous exemplary embodiment, the projection lens comprises the following elements, in the order from the magnified image to the object, that is to say from left to right:
a) a first negative meniscus lens 1210, the concave surface 1212 of which is remote from the projection wall;
b) a second negative meniscus lens 1216, the concave surface 1218 of which is remote from the projection wall;
c) a third negative meniscus lens 1222, the concave surface 1220 of which faces the projection wall;
d) a fourth positive optical assembly 1228, which has only a positive biconvex lens 1232 in this exemplary embodiment, wherein the flatter convex surface 1230 faces the projection wall;
e) a fifth positive meniscus lens 1238, the convex surface 1236 of which faces the projection wall;
f) a sixth negative meniscus lens 1244, the concave surface 1246 of which is configured in aspherical fashion and is remote from the projection wall; the surface 1242 facing the projection wall can also be chosen as an aspherical surface; one variant also dispenses with an aspherical surface;
g) a diaphragm 1234;
h) a seventh positive meniscus lens 1258, the concave surface 1256 of which faces the projection wall;
i) an eighth negative meniscus lens 1262, the concave surface 1260 of which faces the projection wall;
j) a ninth negative biconcave lens 1268, the flatter concave face 1266 of which faces the projection wall;
k) a tenth positive biconvex lens 1274, the more greatly curved face 1272 of which faces the projection wall;
l) an eleventh positive biconvex lens 1280, the more greatly curved face 1278 of which faces the projection wall.

The lenses 1258 and 1262 are cemented together and form a doublet.

Behind the projection lens as viewed from the projection wall there follows an optically equivalent model of a beam combiner 1286 having an optical axis 1290. The beam combiner comprises the segments 1288 and 1292. It additionally has a first surface 1294, furthermore an interface 1296 between the two segments, and also a second surface 1298.

The precise specifications with regard to the individual surfaces of the optical elements of the exemplary embodiment in accordance with FIG. 12 can be found in table 5 together with the respectively associated reference numerals.

The aspheric coefficients of the lens surfaces 1246 of the projection lens in accordance with FIG. 12 are listed in table 6.

Figure 16:
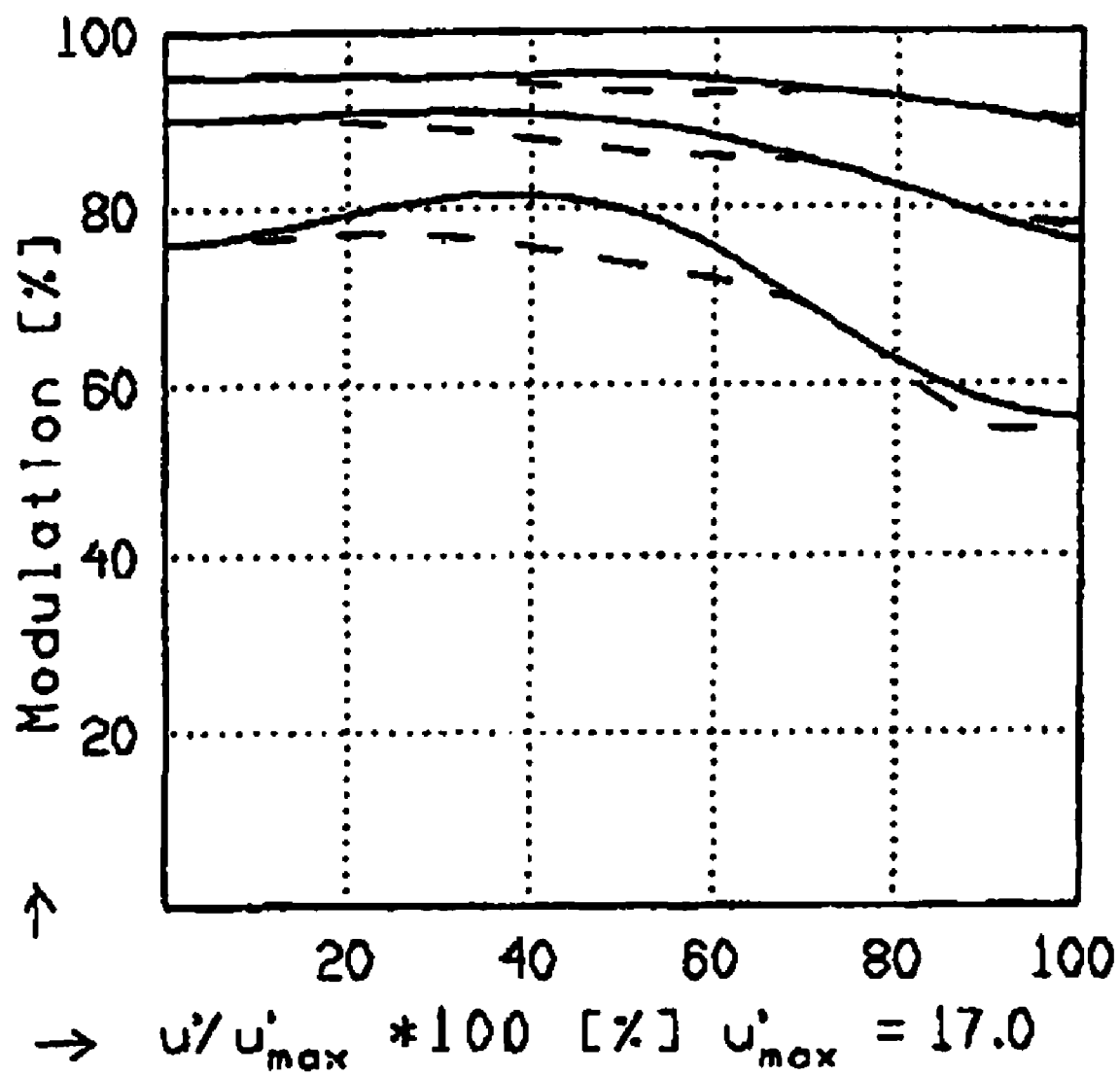
FIG. 16 shows the modulation transfer function of the construction in accordance with FIG. 12 in the green channel for 18, 36 and 72 line pairs per millimeter.

FIGS. 13 to 16, corresponding to FIGS. 8 to 11, graphically illustrate some characteristic parameters for the 60 mm projection lens in accordance with the third exemplary embodiment (FIG. 12), such as the relative illumination (FIG. 13), the distortion (FIG. 14), the profile of the transmittance (FIG. 15) and the resolution (modulation, FIG. 16).

Exemplary Embodiment 4

The fourth exemplary embodiment illustrated in FIG. 17 concerns a projection lens analogously to the second exemplary embodiment in accordance with FIG. 7, but this projection lens is additionally equipped with a focal length extender that was inserted between the lens 750 or 1750 and the lens 758 or 1780.

The projection lens in this exemplary embodiment advantageously comprises the following elements, in the order from the magnified image to the DMD, that is to say from left to right:
a) firstly seven lenses identical to the first seven lenses of the projection lens in accordance with FIG. 7;
b) a focal length extender 1755 comprising
a diaphragm 1754;
a first negative lens 1758, preferably a biconcave lens, wherein preferably the more greatly concave surface 1760 thereof is remote from the projection wall;
a second positive biconvex lens 1764, wherein the more greatly curved surface 1762 thereof faces the projection wall;
a third negative biconcave lens 1770, wherein the flatter surface 1768 thereof faces the projection wall;
a fourth positive biconvex lens 1776, wherein the flatter convex surface 1774 thereof faces the projection wall;
a fifth negative meniscus lens 1780, wherein the concave surface 1778 thereof faces the projection wall;
c) the further lenses are once again identical to the corresponding lenses of the second exemplary embodiment in accordance with FIG. 7. The same applies to the beam combiner 17110.

The precise specifications with regard to the individual surfaces of the optical elements of the exemplary embodiment in accordance with FIG. 17 can be found in table 7 together with the respectively associated reference numerals. The aspheric coefficients of the lens surface 1752 are listed in table 8; they are identical to those of the second exemplary embodiment in accordance with FIG. 7 or table 4.

Figure 21:
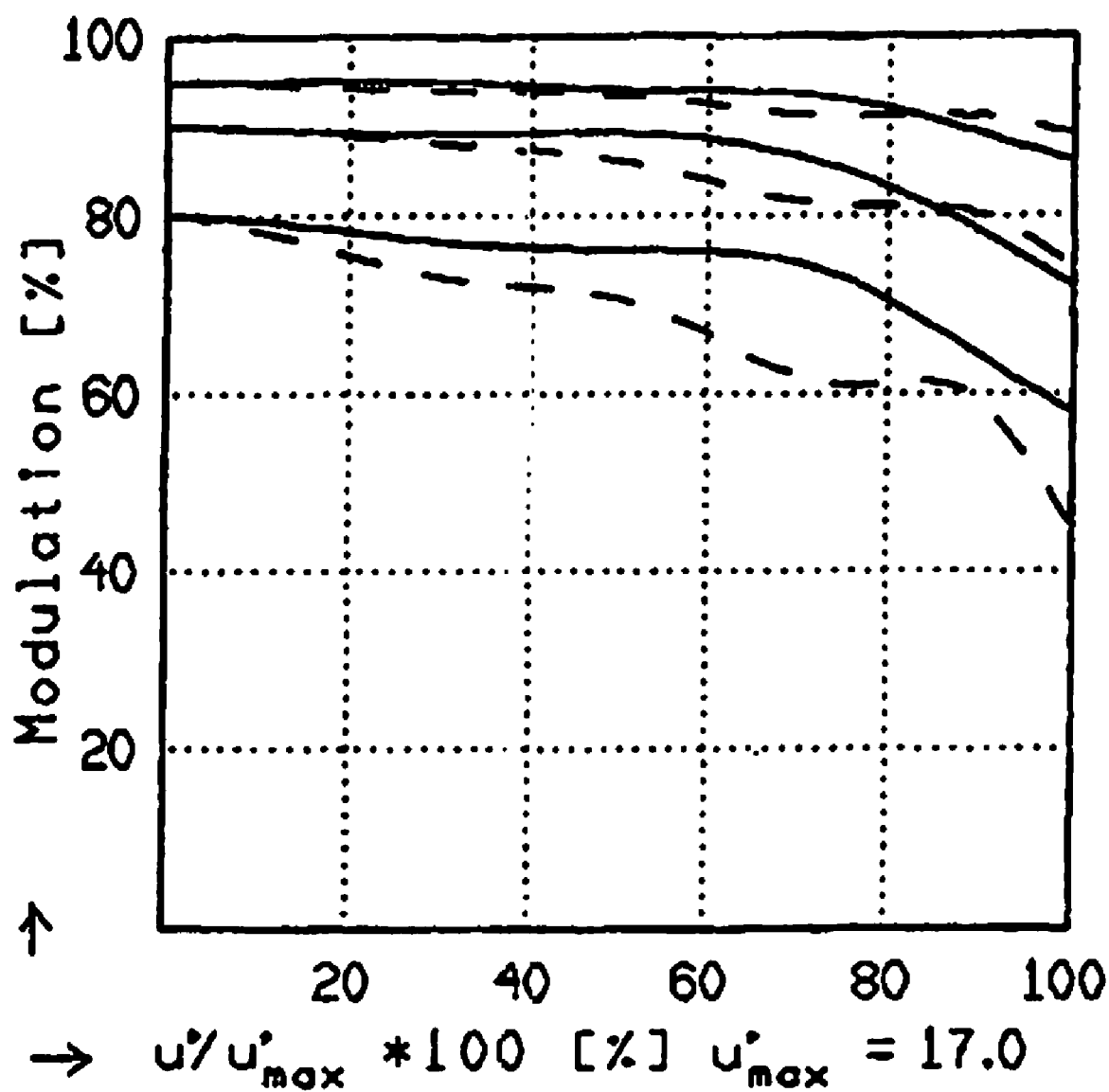
FIG. 21 shows the modulation transfer function of the construction in accordance with FIG. 17 in the green channel for 18, 36 and 72 line pairs per millimeter.

FIGS. 18 to 21, corresponding to FIGS. 8 to 11, graphically illustrate some characteristic parameters for the projection lens in accordance with the fourth exemplary embodiment (FIG. 17), such as the relative illumination (FIG. 18), the distortion (FIG. 19), the profile of the transmittance (FIG. 20) and the resolution (modulation, FIG. 21).

Exemplary Embodiment 5

The fifth exemplary embodiment illustrated in FIG. 22 concerns a projection lens analogously to the third exemplary embodiment in accordance with FIG. 12, but this projection lens is additionally equipped with a focal length extender that was inserted between the lens 1244 or 2244 and the lens 1258 or 2280.

The projection lens in this exemplary embodiment advantageously comprises the following elements, in the order from the magnified image to the DMD, that is to say from left to right:
a) firstly six lenses identical to the first six lenses of the projection lens in accordance with FIG. 12;
b) a focal length extender 2247 comprising
a first negative biconcave lens 2250, wherein the more greatly curved concave surface 2252 thereof is remote from the projection wall, and wherein the concave surface 2248 facing the projection wall is configured in aspherical fashion;
a second positive biconvex lens 2256, wherein the more greatly curved convex surface 2254 thereof faces the projection wall;
a diaphragm 2260;
a third positive meniscus lens 2264, wherein the convex surface 2262 thereof faces the projection wall;
a fourth negative meniscus lens 2268, wherein the convex surface 2266 thereof faces the projection wall;
a fifth negative biconcave lens 2274, wherein the more greatly curved concave surface 2272 thereof faces the projection wall;
c) the further lenses are once again identical to the corresponding lenses of the third exemplary embodiment in accordance with FIG. 12. The same applies to the beam combiner 22106.

The lenses 2264 and 2268 are cemented together and form a doublet.

The precise specifications with regard to the individual surfaces of the optical elements of the exemplary embodiment in accordance with FIG. 22 can be found in table 9 together with the respectively associated reference numerals. The aspheric coefficients of the lens surface 2248 are listed in table 10. The aspheric coefficients of the lens surface 2246 correspond to those in table 6.

Figure 26:
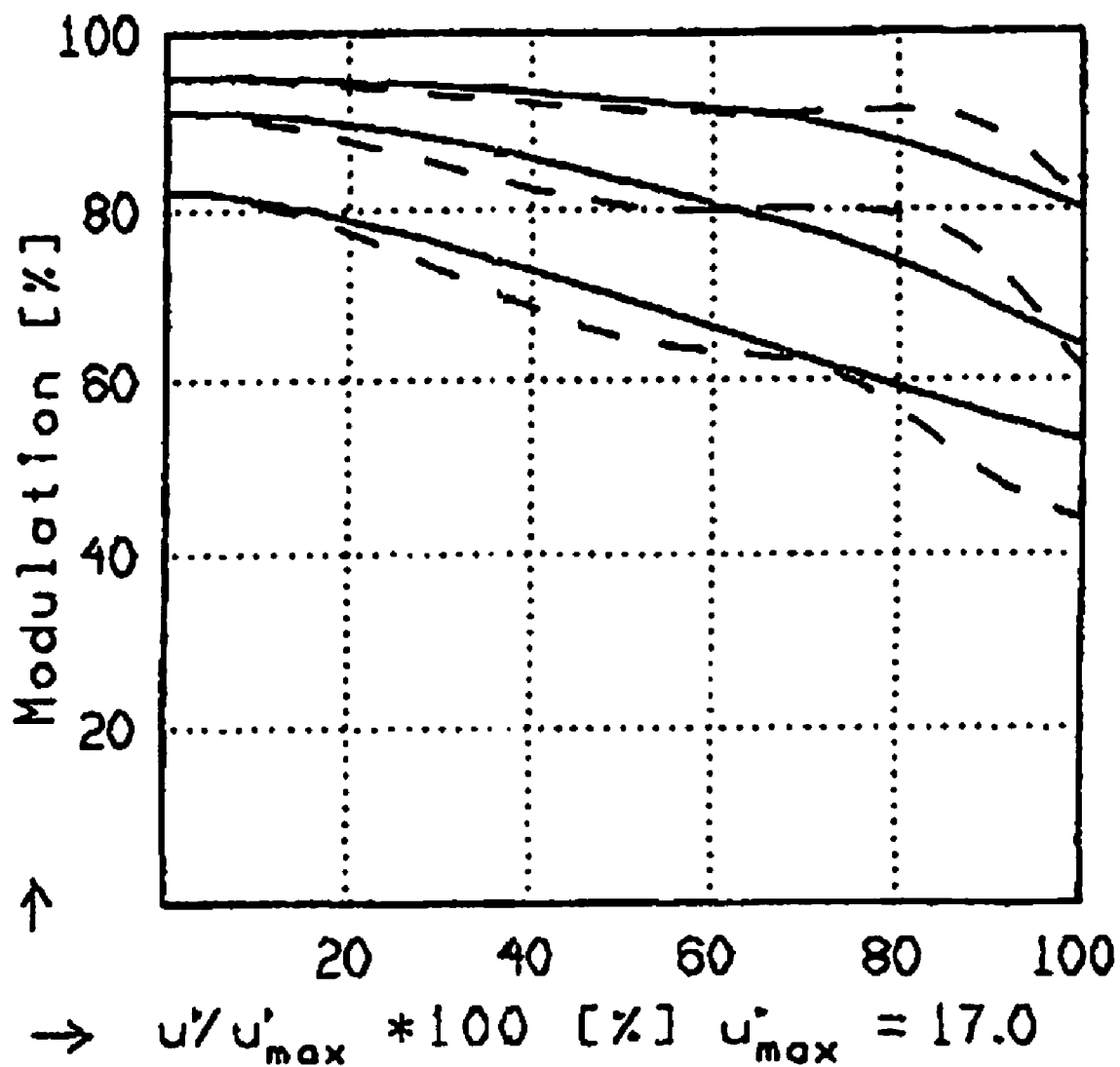
FIG. 26 shows the modulation transfer function of the construction in accordance with FIG. 22 in the green channel for 18, 36 and 72 line pairs per millimeter.

FIGS. 23 to 26, corresponding to FIGS. 8 to 11, graphically illustrate some characteristic parameters for the projection lens in accordance with the fifth exemplary embodiment (FIG. 22), such as the relative illumination (FIG. 23), the distortion (FIG. 24), the profile of the transmittance (FIG. 25) and the resolution (modulation, FIG. 26).

REFERENCE SYMBOLS 208 1st surface of the lens 210
210 Negative meniscus lens
212 2nd surface of the lens 210
214 1st surface of the lens 216
216 Negative meniscus lens
218 2nd surface of the lens 216
220 1st surface of the lens 222
222 Negative biconcave lens
224 2nd surface of the lens 222
228 Positive optical assembly
230 1st surface of the lens 232
232 Positive meniscus lens
234 2nd surface of the lens 232
236 1st surface of the lens 238
238 Meniscus lens
240 2nd surface of the lens 238
242 1st surface of the lens 244
244 Positive meniscus lens
246 2nd surface of the lens 244
248 1st surface of the lens 250
250 Negative meniscus lens
252 2nd surface of the lens 250
254 Diaphragm
256 1st surface of the lens 258
258 Positive biconvex lens
260 2nd surface of the lens 258/1st surface of the lens 262
262 Negative meniscus lens
264 2nd surface of the lens 262
266 1st surface of the lens 268
268 Negative biconcave lens
270 2nd surface of the lens 268
272 1st surface of the lens 274
274 Positive biconvex lens
276 2nd surface of the lens 274
278 1st surface of the lens 280
280 Positive biconvex lens
282 2nd surface of the lens 280
286 Beam combiner
288 1st segment of the beam combiner
290 Optical axis of the beam combiner
292 2nd segment of the beam combiner
294 1st surface of the beam combiner
296 Interface of the beam combiner
298 2nd surface of the beam combiner
708 1st surface of the lens 710
710 Negative meniscus lens
712 2nd surface of the lens 710
714 1st surface of the lens 716
716 Negative meniscus lens
718 2nd surface of the lens 716
720 1st surface of the lens 722
722 Negative biconcave lens
724 2nd surface of the lens 722
728 Positive optical assembly
730 1st surface of the lens 732
732 Positive meniscus lens
734 2nd surface of the lens 732
736 1st surface of the lens 738
738 Meniscus lens
740 2nd surface of the lens 738
742 1st surface of the lens 744
744 Positive meniscus lens
746 2nd surface of the lens 744
748 1st surface of the lens 750
750 Negative meniscus lens
752 2nd surface of the lens 750
754 Diaphragm
756 1st surface of the lens 758
758 Positive biconvex lens
760 2nd surface of the lens 758/1st surface of the lens 762
762 Negative meniscus lens
764 2nd surface of the lens 762
766 1st surface of the lens 768
768 Negative biconcave lens
770 2nd surface of the lens 768
772 1st surface of the lens 774
774 Positive biconvex lens
776 2nd surface of the lens 774
778 1st surface of the lens 780
780 Positive biconvex lens
782 2nd surface of the lens 780
786 Beam combiner
788 1st segment of the beam combiner
790 Optical axis of the beam combiner
792 2nd segment of the beam combiner
794 1st surface of the beam combiner 796 Interface of the beam combiner
798 2nd surface of the beam combiner
1208 1st surface of the lens 1210
1210 Negative meniscus lens
1212 2nd surface of the lens 1210
1214 1st surface of the lens 1216
1216 Negative meniscus lens
1218 2nd surface of the lens 1216
1220 1st surface of the lens 1222
1222 Negative meniscus lens
1224 2nd surface of the lens 1222
1228 Positive optical assembly
1230 1st surface of the lens 1232
1232 Positive biconvex lens
1234 2nd surface of the lens 1232
1236 1st surface of the lens 1238
1238 Positive meniscus lens
1240 2nd surface of the lens 1238
1242 1st surface of the lens 1244
1244 Negative meniscus lens
1246 2nd surface of the lens 1244
1254 Diaphragm
1256 1st surface of the lens 1258
1258 Positive meniscus lens
1260 2nd surface of the lens 1258/1st surface of the lens 1262
1262 Negative meniscus lens
1264 2nd surface of the lens 1262
1266 1st surface of the lens 1266
1268 Negative biconcave lens
1270 2nd surface of the lens 1266
1272 1st surface of the lens 1274
1274 Positive biconvex lens
1276 2nd surface of the lens 1274
1278 1st surface of the lens 1280
1280 Positive biconvex lens
1282 2nd surface of the lens 1280
1286 Beam combiner
1288 1st segment of the beam combiner
1290 Optical axis of the beam combiner
1292 2nd segment of the beam combiner
1294 1st surface of the beam combiner
1296 Interface of the beam combiner
1298 2nd surface of the beam combiner
1708 1st surface of the lens 1710
1710 Negative meniscus lens
1712 2nd surface of the lens 1710
1714 1st surface of the lens 1716
1716 Negative meniscus lens
1718 2nd surface of the lens 1716
1720 1st surface of the lens 1722
1722 Negative biconcave lens
1724 2nd surface of the lens 1722
1728 Positive optical assembly
1730 1st surface of the lens 1732
1732 Positive meniscus lens
1734 2nd surface of the lens 1732
1736 1st surface of the lens 1738
1738 Positive meniscus lens
1740 2nd surface of the lens 1738
1742 1st surface of the lens 1744
1744 Positive meniscus lens
1746 2nd surface of the lens 1744
1748 1st surface of the lens 1750
1750 Negative meniscus lens
1752 2nd surface of the lens 1750
1754 Diaphragm
1755 Focal length extender
1756 1st surface of the lens 1758
1758 Negative meniscus lens
1760 2nd surface of the lens 1758
1762 1st surface of the lens 1764
1764 Positive biconvex lens
1766 2nd surface of the lens 1764
1768 1st surface of the lens 1770
1770 Negative biconcave lens
1772 2nd surface of the lens 1770
1774 1st surface of the lens 1774
1776 Positive biconvex lens
1778 2nd surface of the lens 1174/1st surface of the lens 1780
1780 Negative meniscus lens
1782 2nd surface of the lens 1780
1784 1st surface of the lens 1786
1786 Positive biconvex lines
1788 2nd surface of the lens 1786/1st surface of the lens 1790
1790 Negative meniscus lens
1792 2nd surface of the lens 1762
1794 1st surface of the lens 1796
1796 Negative biconcave lens
1798 2nd surface of the lens 1796
17100 1st surface of the lens 17102
17102 Positive biconvex lens
17103 2nd surface of the lens 17102
17104 1st surface of the lens 17106
17106 Positive biconvex lens
17108 2nd surface of the lens 17106
17110 Beam combiner
17112 Optical axis of the beam combiner
17114 1st segment of the beam combiner
17116 2nd segment of the beam combiner
17118 1st surface of the beam combiner
17120 Interface of the beam combiner
17122 2nd surface of the beam combiner
2208 1st surface of the lens 2210
2210 Negative meniscus lens
2212 2nd surface of the lens 2210
2214 1st surface of the lens 2216
2216 Negative meniscus lens
2218 2nd surface of the lens 2216
2220 1st surface of the lens 2222
2222 Negative meniscus lens
2224 2nd surface of the lens 2222
2228 Positive optical assembly
2230 1st surface of the lens 2232
2232 Positive biconvex lens
2234 2nd surface of the lens 2232
2236 1st surface of the lens 2238
2238 Positive meniscus lens
2240 2nd surface of the lens 2238
2242 1st surface of the lens 2244
2244 Negative meniscus lens
2246 2nd surface of the lens 2244
2247 Focal length extender
2248 1st surface of the lens 2250
2250 Negative biconcave lens
2252 2nd surface of the lens 2250
2254 1st surface of the lens 2256
2256 Positive biconvex lens
2258 2nd surface of the lens 2256
2260 Diaphragm
2262 1st surface of the lens 2264
2264 Positive meniscus lens
2266 2nd surface of the lens 2264/1st surface of the lens 2268
2268 Negative meniscus lens
2270 2nd surface of the lens 2268

2272 1st surface of the lens 2274
2274 Negative biconcave lens
2276 2nd surface of the lens 2274
2278 1st surface of the lens 2280
2280 Positive meniscus lens
2282 2nd surface of the lens 2280/1st surface of the lens 2284
2284 Negative meniscus lens
2286 2nd surface of the lens 2284
2288 1st surface of the lens 2290
2290 Negative biconcave lens
2292 2nd surface of the lens 2290
2294 1st surface of the lens 2296
2296 Positive biconvex lens
2298 2nd surface of the lens 2296
22100 1st surface of the lens 22102
22102 Positive biconvex lens
22104 2nd surface of the lens 22102
22106 Beam combiner
22108 1st segment of the beam combiner
22110 Optical axis of the beam combiner
22112 2nd segment of the beam combiner
22114 1st surface of the beam combiner
22116 Interface of the beam combiner
22118 2nd surface of the beam combiner

TABLE 1

Focal length = 44 mm, F-number = 2.5

| Reference symbol | Radius/mm | Thicknesses or air clearances/mm | Refractive index nd | Abbé number vd |
|---|---|---|---|---|
| 208 | 120.648 | | | |
| 210 | | 7.300 | 1.7552 | 27.5 |
| 212 | 91.484 | | | |
| | | 13.000 | | |
| 214 | 313.438 | | | |
| 216 | | 6.000 | 1.4339 | 95.0 |
| 218 | 74.331 | | | |
| | | 44.830 | | |
| 220 | −1689.208 | | | |
| 222 | | 6.000 | 1.4339 | 95.0 |
| 224 | 72.538 | | | |
| | | 39.430 | | |
| 230 | −346.584 | | | |
| 232 | | 25.000 | 1.4875 | 70.4 |
| 234 | −77.586 | | | |
| | | 17.980 | | |
| 236 | 45.620 | | | |
| 238 | | 5.300 | 1.4339 | 95.0 |
| 240 | 45.620 | | | |
| | | 7.000 | | |
| 242 | 64.828 | | | |
| 244 | | 7.450 | 1.5584 | 54.0 |
| 246 | 155.028 | | | |
| | | 25.000 | | |
| 248 | 82.972 | | | |
| 250 | | 5.720 | 1.4339 | 95.0 |
| 252 | 31.829(*) | | | |
| | | 75.55 | | |
| 256 | 505.311 | | | |
| 258 | | 20.570 | 1.5691 | 71.3 |
| 260 | −40.218 | | | |
| 262 | | 17.340 | 1.6134 | 44.5 |
| 264 | −66.405 | | | |
| | | 8.368 | | |
| 266 | −1689.208 | | | |
| 268 | | 4.940 | 1.6134 | 44.5 |
| 270 | 53.566 | | | |
| | | 5.000 | | |
| 272 | 61.547 | | | |
| 274 | | 11.700 | 1.4339 | 95.0 |
| 276 | −160.546 | | | |
| | | 0.120 | | |

TABLE 1-continued

Focal length = 44 mm, F-number = 2.5

| Reference symbol | Radius/mm | Thicknesses or air clearances/mm | Refractive index nd | Abbé number vd |
|---|---|---|---|---|
| 278 | 102.632 | | | |
| 280 | | 7.700 | 1.4339 | 95.0 |
| 282 | −638.036 | | | |
| | | 12.000 | | |
| 294 | 0.000 | | | |
| 288 | | 116.500 | 1.5168 | 64.2 |
| 296 | 0.000 | | | |
| 292 | | 3.00 | 1.5085 | 61.2 |
| 298 | 0.000 | 0.000 | | |

(*)aspheric

TABLE 2

Aspheric coefficients:

| K (cone constant) | 0 |
| C | 0.0314179 |
| D | $0.500000 * 10^{-7}$ |
| E | $-0.150000 * 10^{-9}$ |
| F | 0 |
| G | 0 |
| H | 0 |

TABLE 3

Focal length = 48 mm, F-number = 2.5

| Reference symbol | Radius/mm | Thicknesses or air clearances/mm | Refractive index nd | Abbé number vd |
|---|---|---|---|---|
| 708 | 120.648 | | | |
| 710 | | 7.550 | 1.7552 | 27.5 |
| 712 | 91.484 | | | |
| | | 10.000 | | |
| 714 | 313.438 | | | |
| 716 | | 6.000 | 1.4339 | 95.0 |
| 718 | 74.331 | | | |
| | | 25.000 | | |
| 720 | −1689.208 | | | |
| 722 | | 6.000 | 1.4339 | 95.0 |
| 724 | 72.538 | | | |
| | | 37.000 | | |
| 730 | −346.584 | | | |
| 732 | | 25.000 | 1.4875 | 70.4 |
| 734 | −77.586 | | | |
| | | 16.377 | | |
| 736 | 45.620 | | | |
| 738 | | 5.300 | 1.4339 | 95.0 |
| 740 | 45.620 | | | |
| | | 5.000 | | |
| 742 | 64.828 | | | |
| 744 | | 7.450 | 1.5584 | 54.0 |
| 746 | 155.028 | | | |
| | | 25.757 | | |
| 748 | 82.972 | | | |
| 750 | | 5.720 | 1.4339 | 95.0 |
| 752 | 31.829 (*) | | | |
| | | 72.88 | | |
| 756 | 460.206 | | | |
| 758 | | 20.570 | 1.5691 | 71.3 |
| 760 | −41.253 | | | |
| 762 | | 17.340 | 1.6134 | 44.5 |
| 764 | −66.405 | | | |
| | | 9.269 | | |
| 766 | −1689.208 | | | |

TABLE 3-continued

Focal length = 48 mm, F-number = 2.5

| Reference symbol | Radius/mm | Thicknesses or air clearances/mm | Refractive index nd | Abbé number vd |
|---|---|---|---|---|
| 768 |  | 4.940 | 1.6134 | 44.5 |
| 770 | 53.566 |  |  |  |
|  |  | 4.950 |  |  |
| 772 | 61.547 |  |  |  |
| 774 |  | 11.700 | 1.4339 | 95.0 |
| 776 | −160.546 |  |  |  |
|  |  | 0.120 |  |  |
| 778 | 102.632 |  |  |  |
| 780 |  | 7.700 | 1.4339 | 95.0 |
| 782 | −638.036 |  |  |  |
|  |  | 12.000 |  |  |
| 794 | 0.000 |  |  |  |
| 788 |  | 116.500 | 1.5168 | 64.2 |
| 796 | 0.000 |  |  |  |
| 792 |  | 3.000 | 1.5085 | 61.2 |
| 798 | 0.000 |  |  |  |

(*) aspheric

TABLE 4

Aspheric coefficients:

| K (cone constant) | 0 |
|---|---|
| C | 0.0314179 |
| D | $0.500000 * 10^{-7}$ |
| E | $-0.150000 * 10^{-9}$ |
| F | 0 |
| G | 0 |
| H | 0 |

TABLE 5

Focal length = 60 mm, F-number = 2.5

| Reference symbol | Radius/mm | Thicknesses or air clearances/mm | Refractive index nd | Abbé number vd |
|---|---|---|---|---|
| 1208 | 260.116 |  |  |  |
| 1210 |  | 6.000 | 1.6477 | 33.8 |
| 1212 | 83.104 |  |  |  |
|  |  | 13.180 |  |  |
| 1214 | 279.392 |  |  |  |
| 1216 |  | 6.000 | 1.4970 | 81.5 |
| 1218 | 59.207 |  |  |  |
|  |  | 26.800 |  |  |
| 1220 | −41.633 |  |  |  |
| 1222 |  | 10.000 | 1.5168 | 64.2 |
| 1224 | −45.620 |  |  |  |
|  |  | 0.100 |  |  |
| 1230 | 206.589 |  |  |  |
| 1232 |  | 9.300 | 1.5584 | 54.0 |
| 1234 | −120.219 |  |  |  |
|  |  | 3.500 |  |  |
| 1236 | 44.003 |  |  |  |
| 1238 |  | 9.450 | 1.5688 | 56.0 |
| 1240 | 47.538 |  |  |  |
|  |  | 33.320 |  |  |
| 1242 | 49.083 |  |  |  |
| 1244 |  | 5.710 | 1.4970 | 81.5 |
| 1246 | 30.177 (*) |  |  |  |
|  |  | 69.880 |  |  |
| 1256 | −450.881 |  |  |  |
| 1258 |  | 15.570 | 1.5924 | 68.3 |
| 1260 | −35.655 |  |  |  |
| 1262 |  | 21.600 | 1.6134 | 44.5 |

TABLE 5-continued

Focal length = 60 mm, F-number = 2.5

| Reference symbol | Radius/mm | Thicknesses or air clearances/mm | Refractive index nd | Abbé number vd |
|---|---|---|---|---|
| 1264 | −62.146 |  |  |  |
|  |  | 11.390 |  |  |
| 1266 | −995.653 |  |  |  |
| 1268 |  | 4.940 | 1.6134 | 44.5 |
| 1270 | 56.656 |  |  |  |
|  |  | 5.000 |  |  |
| 1272 | 65.581 |  |  |  |
| 1274 |  | 11.700 | 1.4388 | 95.0 |
| 1276 | −165.829 |  |  |  |
|  |  | 0.120 |  |  |
| 1278 | 84.755 |  |  |  |
| 1280 |  | 7.700 | 1.4388 | 95.0 |
| 1282 | −750.449 |  |  |  |
|  |  | 12.000 |  |  |
| 1294 | 0.000 |  |  |  |
| 1288 |  | 116.500 | 1.5168 | 64.2 |
| 1296 | 0.000 |  |  |  |
| 1292 |  | 3.000 | 1.5085 | 61.2 |
| 1298 | 0.000 |  |  |  |

(*) aspheric

TABLE 6

Aspheric coefficients:

| K (cone constant) | 0 |
|---|---|
| C | 0.033138 |
| D | $0.890000 * 10^{-7}$ |
| E | $-0.170000 * 10^{-9}$ |
| F | $-0.700000 * 10^{-13}$ |
| G | 0 |
| H | 0 |

TABLE 7

Focal length = 48 mm, F-number = 2.5, with focal length extender

| Reference symbol | Radius/mm | Thicknesses or air clearances/mm | Refractive index nd | Abbé number vd |
|---|---|---|---|---|
| 1708 | 120.648 |  |  |  |
| 1710 |  | 7.550 | 1.7552 | 27.5 |
| 1712 | 91.484 |  |  |  |
|  |  | 10.000 |  |  |
| 1714 | 313.438 |  |  |  |
| 1716 |  | 6.000 | 1.4339 | 95.0 |
| 1718 | 74.331 |  |  |  |
|  |  | 25.000 |  |  |
| 1720 | −1.689.208 |  |  |  |
| 1722 |  | 6.000 | 1.4339 | 95.0 |
| 1724 | 72.538 |  |  |  |
|  |  | 37.000 |  |  |
| 1730 | −346.584 |  |  |  |
| 1732 |  | 25.000 | 1.4875 | 70.4 |
| 1734 | −77.586 |  |  |  |
|  |  | 16.377 |  |  |
| 1736 | 45.620 |  |  |  |
| 1738 |  | 5.300 | 1.4339 | 95.0 |
| 1740 | 45.620 |  |  |  |
|  |  | 5.000 |  |  |
| 1742 | 64.828 |  |  |  |
| 1744 |  | 7.450 | 1.5584 | 54.0 |
| 1746 | 155.028 |  |  |  |
|  |  | 25.757 |  |  |

TABLE 7-continued

Focal length = 48 mm, F-number = 2.5, with focal length extender

| Reference symbol | Radius/mm | Thicknesses or air clearances/mm | Refractive index nd | Abbé number vd |
|---|---|---|---|---|
| 1748 | 82.972 | | | |
| 1750 | | 5.720 | 1.4339 | 95.0 |
| 1752 | 31.829* | | | |
| | | 10.000 | | |
| 1756 | −1090.064 | | | |
| 1758 | | 2.500 | 1.5168 | 64.2 |
| 1760 | 102.356 | | | |
| | | 0.100 | | |
| 1762 | 46.064 | | | |
| 1764 | | 8.900 | 1.6201 | 63.5 |
| 1766 | −117.272 | | | |
| | | 11.667 | | |
| 1768 | −71.852 | | | |
| 1770 | | 2.887 | 1.8467 | 23.8 |
| 1772 | 57.079 | | | |
| | | 1.995 | | |
| 1774 | 72.646 | | | |
| 1776 | | 9.251 | 1.8467 | 23.8 |
| 1778 | −61.080 | | | |
| 1780 | | 2.500 | 1.8350 | 43.0 |
| 1782 | −5401.582 | | | |
| | | 23.080 | | |
| 1784 | 460.206 | | | |
| 1786 | | 20.570 | 1.5691 | 71.3 |
| 1788 | −41.253 | | | |
| 1790 | | 17.340 | 1.6134 | 44.5 |
| 1792 | −66.405 | | | |
| | | 9.269 | | |
| 1794 | −1689.208 | | | |
| 1796 | | 4.940 | 1.6134 | 44.5 |
| 1798 | 53.566 | | | |
| | | 4.950 | | |
| 17100 | 61.547 | | | |
| 17102 | | 11.700 | 1.4339 | 95.0 |
| 17103 | −160.546 | | | |
| | | 0.120 | | |
| 17104 | 102.632 | | | |
| 17106 | | 7.700 | 1.4339 | 95.0 |
| 17108 | −638.036 | | | |
| | | 12.000 | | |
| 17118 | 0.000 | | | |
| 17114 | | 116.50 | 1.5168 | 64.2 |
| 17120 | 0.000 | | | |
| 17116 | | 3.000 | 1.5085 | 61.2 |
| 17122 | 0.000 | | | |

*aspheric

TABLE 8

| Aspheric coefficients: | |
|---|---|
| K (cone constant) | 0 |
| C | 0.0314179 |
| D | 0.500000 * 10⁻⁷ |
| E | −0.150000 * 10⁻⁹ |
| F | 0 |
| G | 0 |
| H | 0 |

TABLE 9

Focal length = 60 mm, F-number = 2.5, with focal length extender

| Reference symbol | Radius/mm | Thicknesses or air clearances/mm | Refractive index nd | Abbé number vd |
|---|---|---|---|---|
| 2208 | 260.116 | | | |
| 2210 | | 6.000 | 1.6477 | 33.8 |
| 2212 | 83.104 | | | |
| | | 13.180 | | |
| 2214 | 279.392 | | | |
| 2216 | | 6.000 | 1.4970 | 81.5 |
| 2218 | 59.207 | | | |
| | | 26.800 | | |
| 2220 | −41.633 | | | |
| 2222 | | 10.000 | 1.5168 | 64.2 |
| 2224 | −45.620 | | | |
| | | 0.100 | | |
| 2230 | 206.589 | | | |
| 2232 | | 9.300 | 1.5584 | 54.0 |
| 2234 | −120.219 | | | |
| | | 3.500 | | |
| 2236 | 44.003 | | | |
| 2238 | | 9.450 | 1.5688 | 56.0 |
| 2240 | 47.538 | | | |
| | | 33.320 | | |
| 2242 | 49.083 | | | |
| 2244 | | 5.710 | 1.4970 | 81.5 |
| 2246 | 30.177* | | | |
| | | 7.120 | | |
| 2248 | −447.776* | | | |
| 2250 | | 1.900 | 1.6200 | 36.3 |
| 2252 | 62.709 | | | |
| | | 1.080 | | |
| 2254 | 50.447 | | | |
| 2256 | | 9.900 | 1.6030 | 65.5 |
| 2258 | −135.991 | | | |
| | | 10.610 | | |
| 2262 | 62.451 | | | |
| 2264 | | 4.970 | 1.8467 | 23.8 |
| 2266 | 108.556 | | | |
| 2268 | | 3.240 | 1.8830 | 40.8 |
| 2270 | 86.779 | | | |
| | | 5.630 | | |
| 2272 | −163.039 | | | |
| 2274 | | 2.410 | 1.8830 | 40.8 |
| 2276 | 180.333 | | | |
| | | 23.020 | | |
| 2278 | −450.881 | | | |
| 2280 | | 15.570 | 1.5924 | 68.3 |
| 2282 | −35.655 | | | |
| 2284 | | 21.600 | 1.6134 | 44.3 |
| 2286 | −62.146 | | | |
| | | 11.390 | | |
| 2288 | −995.653 | | | |
| 2290 | | 4.940 | 1.6134 | 44.5 |
| 2292 | 56.656 | | | |
| | | 5.000 | | |
| 2294 | 65.581 | | | |
| 2296 | | 11.700 | 1.4388 | 95.0 |
| 2298 | −165.829 | | | |
| | | 0.120 | | |
| 22100 | 84.755 | | | |
| 22102 | | 7.700 | 1.4388 | 95.0 |
| 22104 | −750.449 | | | |
| | | 12.000 | | |
| 22114 | 0.000 | | | |
| 22108 | | 116.500 | 1.5168 | 62.2 |
| 22116 | 0.000 | | | |
| 22112 | | 3.000 | 1.5085 | 61.2 |
| 22118 | 0.000 | | | |

*aspheric

TABLE 10

| Aspheric coefficients area 2248: | |
| --- | --- |
| K (cone constant) | 0 |
| C | −0.0022333 |
| D | $0.610000 * 10^{-7}$ |
| E | $-0.200000 * 10^{-9}$ |
| F | 0 |
| G | 0 |
| H | 0 |

The invention claimed is:

1. An optical system comprising:
    a) a projection lens for the projection of digital image data with a fixed focal length; and
    b) a focal length extender that can be inserted into the projection lens and increases the focal length of the projection lens,
    c) wherein the focal length extender can be inserted into an air space within the lens arrangement of the projection lens;
    d) wherein the focal length extender has the following elements in the order specified, as viewed from a projection wall:
        d1) a first negative lens;
        d2) a second positive lens; and
        d3) at least three further lenses.

2. The optical system as claimed in claim 1, wherein the at least three further lenses of the focal length extender are embodied as follows in the order specified, as viewed from the projection wall:
    c) a third negative lens;
    d) a fourth positive lens; and
    e) a fifth negative lens.

3. The optical system as claimed in claim 1, wherein the at least three further lenses of the focal length extender are embodied as follows in the order specified, as viewed from the projection wall:
    c) a third positive lens;
    d) a fourth negative lens; and
    e) a fifth negative lens.

4. The optical system as claimed in claim 1, wherein the projection lens has the following elements in the order specified, as viewed from a projection wall:
    a) a first negative lens;
    b) a second negative lens;
    c) a third negative lens;
    d) a fourth positive optical assembly;
    e) a fifth positive lens;
    f) a sixth negative lens;
    g) a seventh lens;
    h) an eighth lens;
    i) a ninth negative lens;
    j) a tenth positive lens; and
    k) an eleventh positive lens.

5. The optical system as claimed in claim 4, characterized in that the fourth positive optical assembly of the projection lens has two lenses.

6. The optical system as claimed in claim 4, characterized in that the fourth positive optical assembly of the projection lens has precisely one positive lens.

7. The optical system as claimed in claim 1, characterized in that the projection lens has a diaphragm between the sixth negative lens and the seventh positive lens;
    in that in the projection lens at least one negative lens in front of the diaphragm is formed from fluor crown or CaF2; and
    in that in the projection lens at least one positive lens behind the diaphragm is formed from fluor crown or CaF2.

8. A projection lens for the projection of digital image data, which consists of the following elements in the order specified, as viewed from a projection wall:
    a) a first negative lens;
    b) a second negative lens;
    c) a third negative lens;
    d) a fourth positive optical assembly having two lenses;
    e) a fifth positive lens;
    f) a sixth negative lens;
    f1) a diaphragm
    g) a seventh lens;
    h) an eighth lens;
    i) a ninth negative lens;
    j) a tenth positive lens; and
    k) an eleventh positive lens.

9. The projection lens as claimed in claim 8, characterized in that at least one negative lens in front of the diaphragm is formed from fluor crown or CaF2; and
    in that at least one positive lens behind the diaphragm is formed from fluor crown or CaF2.

10. A projection lens for the projection of digital image data, which consists of the following elements in the order specified, as viewed from a projection wall:
    a) a first negative lens;
    b) a second negative lens;
    c) a third negative lens;
    d) a fourth positive lens;
    e) a fifth positive lens;
    f) a sixth negative lens;
    g) a diaphragm;
    h) a seventh lens;
    i) an eighth lens;
    j) a ninth negative lens;
    k) a tenth positive lens; and
    l) an eleventh positive lens;
    wherein at least one negative lens in front of the diaphragm is formed from fluor crown or CaF2; and
    wherein at least one positive lens behind the diaphragm is formed from fluor crown or CaF2.

* * * * *